United States Patent
Wu et al.

(10) Patent No.: US 10,945,153 B2
(45) Date of Patent: Mar. 9, 2021

(54) NETWORK-ASSISTED SCHEDULING FOR PACKET DUPLICATION IN VEHICLE-BASED SIDELINK COMMUNICATION

(71) Applicant: QUALCOMM Incorporated, San Diego, CA (US)

(72) Inventors: Zhibin Wu, Sunnyvale, CA (US); Sudhir Kumar Baghel, Hillsborough, NJ (US); Hong Cheng, Bridgewater, NJ (US); Michaela Vanderveen, Tracy, CA (US); Junyi Li, Chester, NJ (US); Kapil Gulati, Dover, DE (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/270,538

(22) Filed: Feb. 7, 2019

(65) Prior Publication Data
US 2019/0253919 A1     Aug. 15, 2019

Related U.S. Application Data

(60) Provisional application No. 62/631,445, filed on Feb. 15, 2018.

(51) Int. Cl.
*H04W 28/02*      (2009.01)
*H04W 72/12*      (2009.01)
(Continued)

(52) U.S. Cl.
CPC ......... *H04W 28/0273* (2013.01); *H04L 5/001* (2013.01); *H04W 4/40* (2018.02);
(Continued)

(58) Field of Classification Search
CPC ......... H04W 28/0273; H04W 28/0236; H04W 28/0263; H04W 4/40; H04W 72/02;
(Continued)

(56) References Cited

U.S. PATENT DOCUMENTS

2018/0049193 A1*  2/2018  Belleschi ............... H04W 72/02
2018/0302886 A1*  10/2018  Pan ...................... H04W 72/044
(Continued)

OTHER PUBLICATIONS

ZTE-3GPP TSG-RAN WG2 Meeting #100 R2-1713072-Discussion on sidelink resource request mechanism in PC5 CA (Year: 2017 ).*
(Continued)

*Primary Examiner* — Candal Elpenord
(74) *Attorney, Agent, or Firm* — Holland & Hart LLP

(57) ABSTRACT

Methods, systems, and devices for wireless communications are described. A user equipment (UE) may determine that a profile for vehicle-based sidelink communications supports packet duplication using a set of carrier frequencies. The UE may transmit a request to a base station for resources to use to perform the vehicle-based sidelink communications, the request comprising an indication of the profile, a reliability metric associated with the profile, and an identifier that identifies the set of carrier frequencies. The UE may receive one or more grants from the base station for semi-persistent scheduling resources allocated on the set of carrier frequencies in response to the request.

29 Claims, 15 Drawing Sheets

(51) Int. Cl.

| | |
|---|---|
| *H04W 72/14* | (2009.01) |
| *H04W 4/40* | (2018.01) |
| *H04L 5/00* | (2006.01) |
| *H04W 72/08* | (2009.01) |
| *H04W 80/08* | (2009.01) |
| *H04W 76/14* | (2018.01) |

(52) U.S. Cl.
CPC ... *H04W 28/0236* (2013.01); *H04W 28/0263* (2013.01); *H04W 72/087* (2013.01); *H04W 72/121* (2013.01); *H04W 72/1263* (2013.01); *H04W 72/14* (2013.01); *H04W 76/14* (2018.02); *H04W 80/08* (2013.01)

(58) Field of Classification Search
CPC . H04W 72/04; H04W 72/087; H04W 72/121; H04W 72/1263; H04W 72/14; H04W 76/08; H04W 80/08; H04L 5/001
See application file for complete search history.

(56) References Cited

U.S. PATENT DOCUMENTS

| | | | | |
|---|---|---|---|---|
| 2019/0158993 | A1* | 5/2019 | Kwon | H04W 4/70 |
| 2019/0239112 | A1* | 8/2019 | Rao | H04W 4/40 |
| 2019/0246420 | A1* | 8/2019 | Park | H04W 72/087 |

OTHER PUBLICATIONS

International Search Report and Written Opinion—PCT/US2019/017344—ISA/EPO—dated May 3, 2019.
3rd Generation Partnership Project; Technical Specification Group Radio Access Network; Evolved Universal Terrestrial Radio Access (E-UTRA); Radio Resource Control (RRC); Protocol specification(Release 15), 3GPP Standard; Technical Specification; 3GPP TS 36.331, 3rd Generation Partnership Project (3GPP), Mobile Competence Centre, 650, Route Des Lucioles, F-06921 Sophia-Antipolis Cedex, France, vol. RAN WG2. No. V15.0.1, Jan. 9, 2018 (Jan. 9, 2018), pp. 1-776, XP051392555, [retrieved on Jan. 9, 2018], Section 5.10; pp. 216-251, sidelinkUEinformation message; pp. 303-305, UEAssistanceInformation message; pp. 315-317.
ZTE Corporation: "Discussion on Mode 3 Resource Allocation in PC5 CA", 3GPP Draft; R2-1801960, 3rd Generation Partnership Project (3GPP), Mobile Competence Centre, 650, Route Des Lucioles, F-06921 Sophia-Antipolis Cedex, France, vol. RAN WG2. No. Athens, Greece; Feb. 26, 2018-Mar. 2, 2018, Feb. 14, 2018 (Feb. 14, 2018),5 Pages, XP051399052, Retrieved from the Internet: URL: http://www.3gpp.org/ftp/tsg_ran/WG2_RL2/TSGR2_101/Docs/ [retrieved on Feb. 14, 2018], Section 2.1; p. 1, Section 2.2, Data Duplication Section; p. 2, Section 2.3; pp. 3, 4, Section 3; pp. 4, 5.
ZTE: "Discussion on Carrier Selection in PC5 CA", 3GPP DRAFT; R2- 1713070, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 27, 2017-Dec. 1, 2017, Nov. 17, 2017, 6 Pages, XP051371898, Retrieved from the Internet: URL:http://www.3gpp.org/ftp/tsg_ran/WG2_RL2/TSGR2_100/Docs/ [retrieved on Nov. 17, 2017], Section 2.

* cited by examiner

NETWORK-ASSISTED SCHEDULING FOR PACKET DUPLICATION IN VEHICLE-BASED SIDELINK COMMUNICATION

CROSS REFERENCES

The present Application for patent claims benefit of U.S. Provisional Patent Application No. 62/631,445 by WU et al., entitled "NETWORK-ASSISTED SCHEDULING FOR PACKET DUPLICATION IN VEHICLE-BASED SIDELINK COMMUNICATION," filed Feb. 15, 2018, assigned to the assignee hereof, and expressly incorporated by reference in its entirety.

BACKGROUND

The following relates generally to wireless communications, and more specifically to network-assisted scheduling for packet duplication in vehicle-based sidelink communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread-orthogonal frequency-division multiplexing (DFT-s-OFDM). A wireless multiple-access communications system may include a number of base stations or network access nodes, each simultaneously supporting communication for multiple communication devices, which may be otherwise known as user equipment (UE).

Wireless communications systems may include or support networks used for vehicle-based communications, also referred to as vehicle-to-everything (V2X) networks, vehicle-to-vehicle (V2V) networks, and/or cellular V2X (C-V2X) networks. Vehicle-based communication networks may provide always-on telematics where UEs (e.g., vehicle UEs (v-UEs)) communicate directly to the network (e.g., via vehicle-to-network (V2N) communications), to pedestrian UEs (e.g., via vehicle-to-pedestrians (V2P) communications), to infrastructure devices (vehicle-to-infrastructure (V2I) communications), and to other v-UEs (e.g., via the network and/or directly via V2V communications). The vehicle-based communication networks may support a safe, always-connected driving experience by providing intelligent connectivity where traffic signal/timing, real-time traffic and routing, safety alerts to pedestrians/bicyclist, collision avoidance information, and the like are exchanged.

Some wireless communications systems may also support packet data convergence protocol (PDCP) duplication. For example, PDCP duplication may be supported for carrier aggregation (CA) and/or for dual-connectivity (DC). CA may include one base station aggregating multiple carriers (also called component carriers (CCs)) for the UE, where the PDCP protocol data unit (PDU) is duplicated on each carrier. DC may include two or more base stations, a master node (MN) and one or more secondary node(s) (SN), performing transmissions to the UE, where the PDCP PDU is duplicated by each node.

Generally, CA packet duplication using multiple carriers may be used to improve the reliability of V2X packet delivery. However, for network-assisted scheduling, conventional signaling designs may not allow the UE and the base station to exchange sufficient information for the network to schedule a sufficient amount resources for sidelink communication grants. For semi-persistent scheduling (SPS), multiple SPS grants in at least two different carriers may be created by the base station in order for the UE to send the same PDCP PDU using CA packet duplication to other UEs.

SUMMARY

The described techniques relate to improved methods, systems, devices, or apparatuses that support network-assisted scheduling for packet duplication in vehicle-based sidelink communication. Generally, the described techniques provide an efficient mechanism that supports signaling techniques between a base stations and a user equipment (UE) that improves scheduling in order to provide sufficient resources for vehicle-based sidelink communications using carrier aggregation (CA) based packet duplication. In some aspects, this may include the UE determining that a traffic profile for vehicle-based sidelink communications supports packet duplication using one or more component carriers (CCs). For example, the traffic class or service for the vehicle-based sidelink communications may have a certain reliability metric that warrants packet duplication in order to comply with the reliability threshold. Therefore, the UE may transmit a request to a base station requesting resources for the UE to use to perform the vehicle-based sidelink communications. The request may be sent in one or two messages to the base station, with each message including certain information associated with the vehicle-based sidelink communications. For example, a first message may include or otherwise provide an indication of the profile (e.g., the traffic profile, the service type, and the like), as well as identifying a set of carrier frequencies that can be used for the vehicle-based sidelink communications. The second message may provide information based at least in part on the profile (e.g., such as an index for the traffic profile) as well as an indication of the reliability metric associated with the vehicle-based sidelink communications.

In some aspects, the base station may receive this request and determine whether, and, if so, how to support the packet duplication for the UE. For example, if the base station decides to allow the packet duplication (e.g., has sufficient resources, the profile warrants the allocation of CCs, etc.), the base station may transmit one or more grants for semi-persistent scheduling (SPS) resources that have been allocated on the set of carrier frequencies. In some examples, the base station may use an SPS configuration information element in a radio resource control (RRC) message to provide the indication the one or more grants. The UE may receive the one or more grants from the base station and use the SPS resources on the set of carrier frequencies to perform the vehicle-based sidelink communications.

A method of wireless communication at a user equipment is described. The method may include determining that a profile for vehicle-based sidelink communications supports packet duplication using a set of carrier frequencies, transmitting a request to a base station for resources to use to perform the vehicle-based sidelink communications, the request comprising an indication of the profile, a reliability metric associated with the profile, and an identifier that identifies the set of carrier frequencies, and receiving one or more grants from the base station for SPS resources allocated on the set of carrier frequencies in response to the request.

An apparatus for wireless communication at a user equipment is described. The apparatus may include means for determining that a profile for vehicle-based sidelink communications supports packet duplication using a set of carrier frequencies, means for transmitting a request to a base station for resources to use to perform the vehicle-based sidelink communications, the request comprising an indication of the profile, a reliability metric associated with the profile, and an identifier that identifies the set of carrier frequencies, and means for receiving one or more grants from the base station for SPS resources allocated on the set of carrier frequencies in response to the request.

Another apparatus for wireless communication at a user equipment is described. The apparatus may include a processor, memory in electronic communication with the processor, and instructions stored in the memory. The instructions may be operable to cause the processor to determine that a profile for vehicle-based sidelink communications supports packet duplication using a set of carrier frequencies, transmit a request to a base station for resources to use to perform the vehicle-based sidelink communications, the request comprising an indication of the profile, a reliability metric associated with the profile, and an identifier that identifies the set of carrier frequencies, and receive one or more grants from the base station for SPS resources allocated on the set of carrier frequencies in response to the request.

A non-transitory computer-readable medium for wireless communication at a user equipment is described. The non-transitory computer-readable medium may include instructions operable to cause a processor to determine that a profile for vehicle-based sidelink communications supports packet duplication using a set of carrier frequencies, transmit a request to a base station for resources to use to perform the vehicle-based sidelink communications, the request comprising an indication of the profile, a reliability metric associated with the profile, and an identifier that identifies the set of carrier frequencies, and receive one or more grants from the base station for SPS resources allocated on the set of carrier frequencies in response to the request.

Some examples of the method, apparatus, and non-transitory computer-readable medium described above may further include processes, features, means, or instructions for transmitting a signal indicating that packet duplication may be supported using the set of carrier frequencies.

Some examples of the method, apparatus, and non-transitory computer-readable medium described above may further include processes, features, means, or instructions for transmitting a sidelink information message to the base station to indicate the profile and the identifier.

Some examples of the method, apparatus, and non-transitory computer-readable medium described above may further include processes, features, means, or instructions for transmitting an assistance information message to the base station to indicate the reliability metric, the assistance information message comprising an index value associated with the profile.

Some examples of the method, apparatus, and non-transitory computer-readable medium described above may further include processes, features, means, or instructions for configuring the assistance information message to indicate a subset of carrier frequencies of the set of carrier frequencies to indicate the number of carrier frequencies to use for packet duplication.

Some examples of the method, apparatus, and non-transitory computer-readable medium described above may further include processes, features, means, or instructions for identifying a destination identifier for the vehicle-based sidelink communications, wherein the profile may be based at least in part on the destination layer identifier.

Some examples of the method, apparatus, and non-transitory computer-readable medium described above may further include processes, features, means, or instructions for receiving the one or more grants in one or more downlink control indicators (DCIs) from the base station.

Some examples of the method, apparatus, and non-transitory computer-readable medium described above may further include processes, features, means, or instructions for receiving more than one grant containing the same SPS index.

A method of wireless communication at a base station is described. The method may include receiving a request from a UE for resources, the request comprising an indication of a profile for vehicle-based sidelink communications, a reliability metric associated with the profile, and an identifier that identifies a set of carrier frequencies to use for packet duplication during the vehicle-based sidelink communications and transmitting one or more grants to the UE for SPS resources allocated on the set of carrier frequencies in response to the request.

An apparatus for wireless communication at a base station is described. The apparatus may include means for receiving a request from a UE for resources, the request comprising an indication of a profile for vehicle-based sidelink communications, a reliability metric associated with the profile, and an identifier that identifies a set of carrier frequencies to use for packet duplication during the vehicle-based sidelink communications and means for transmitting one or more grants to the UE for SPS resources allocated on the set of carrier frequencies in response to the request.

Another apparatus for wireless communication at a base station is described. The apparatus may include a processor, memory in electronic communication with the processor, and instructions stored in the memory. The instructions may be operable to cause the processor to receive a request from a UE for resources, the request comprising an indication of a profile for vehicle-based sidelink communications, a reliability metric associated with the profile, and an identifier that identifies a set of carrier frequencies to use for packet duplication during the vehicle-based sidelink communications and transmit one or more grants to the UE for SPS resources allocated on the set of carrier frequencies in response to the request.

A non-transitory computer-readable medium for wireless communication at a base station is described. The non-transitory computer-readable medium may include instructions operable to cause a processor to receive a request from a UE for resources, the request comprising an indication of a profile for vehicle-based sidelink communications, a reliability metric associated with the profile, and an identifier that identifies a set of carrier frequencies to use for packet duplication during the vehicle-based sidelink communications and transmit one or more grants to the UE for SPS resources allocated on the set of carrier frequencies in response to the request.

Some examples of the method, apparatus, and non-transitory computer-readable medium described above may further include processes, features, means, or instructions for determining, based at least in part on the request, whether to support packet duplication for the vehicle-based sidelink communications, wherein the one or more grants may be configured based at least in part on the determination.

Some examples of the method, apparatus, and non-transitory computer-readable medium described above may further include processes, features, means, or instructions for identifying a threshold value for the vehicle-based sidelink communications, wherein the determination of whether to support packet duplication may be based at least in part on the reliability metric satisfying the threshold.

Some examples of the method, apparatus, and non-transitory computer-readable medium described above may further include processes, features, means, or instructions for identifying the set of carrier frequencies to use for packet duplication based at least in part on at least one of the reliability metric satisfying the threshold, or an availability of a sidelink resource, or a combination thereof.

In some examples of the method, apparatus, and non-transitory computer-readable medium described above, transmitting the one or more grants comprises configuring a RRC message to indicate an SPS configuration associated with the set of carrier frequencies to use for packet duplication and a corresponding SPS index.

In some examples of the method, apparatus, and non-transitory computer-readable medium described above, the SPS configuration may be associated with one or more grants matching the profile for the vehicle-based sidelink communications.

Some examples of the method, apparatus, and non-transitory computer-readable medium described above may further include processes, features, means, or instructions for receiving a signal indicating that packet duplication may be supported using the set of carrier frequencies.

Some examples of the method, apparatus, and non-transitory computer-readable medium described above may further include processes, features, means, or instructions for receiving a sidelink information message from the UE indicating the profile and the identifier.

Some examples of the method, apparatus, and non-transitory computer-readable medium described above may further include processes, features, means, or instructions for receiving an assistance information message from the UE indicating the reliability metric, the assistance information message comprising an index value associated with the profile.

Some examples of the method, apparatus, and non-transitory computer-readable medium described above may further include processes, features, means, or instructions for decoding the assistance information message to identify a subset of carrier frequencies of the set of carrier frequencies that indicates the number of carrier frequencies to use for packet duplication.

In some examples of the method, apparatus, and non-transitory computer-readable medium described above, the profile may be based at least in part on a destination identifier associated with the vehicle-based sidelink communications.

Some examples of the method, apparatus, and non-transitory computer-readable medium described above may further include processes, features, means, or instructions for transmitting the one or more grants in one or more DCIs containing an SPS index.

DETAILED DESCRIPTION

Figure 1:
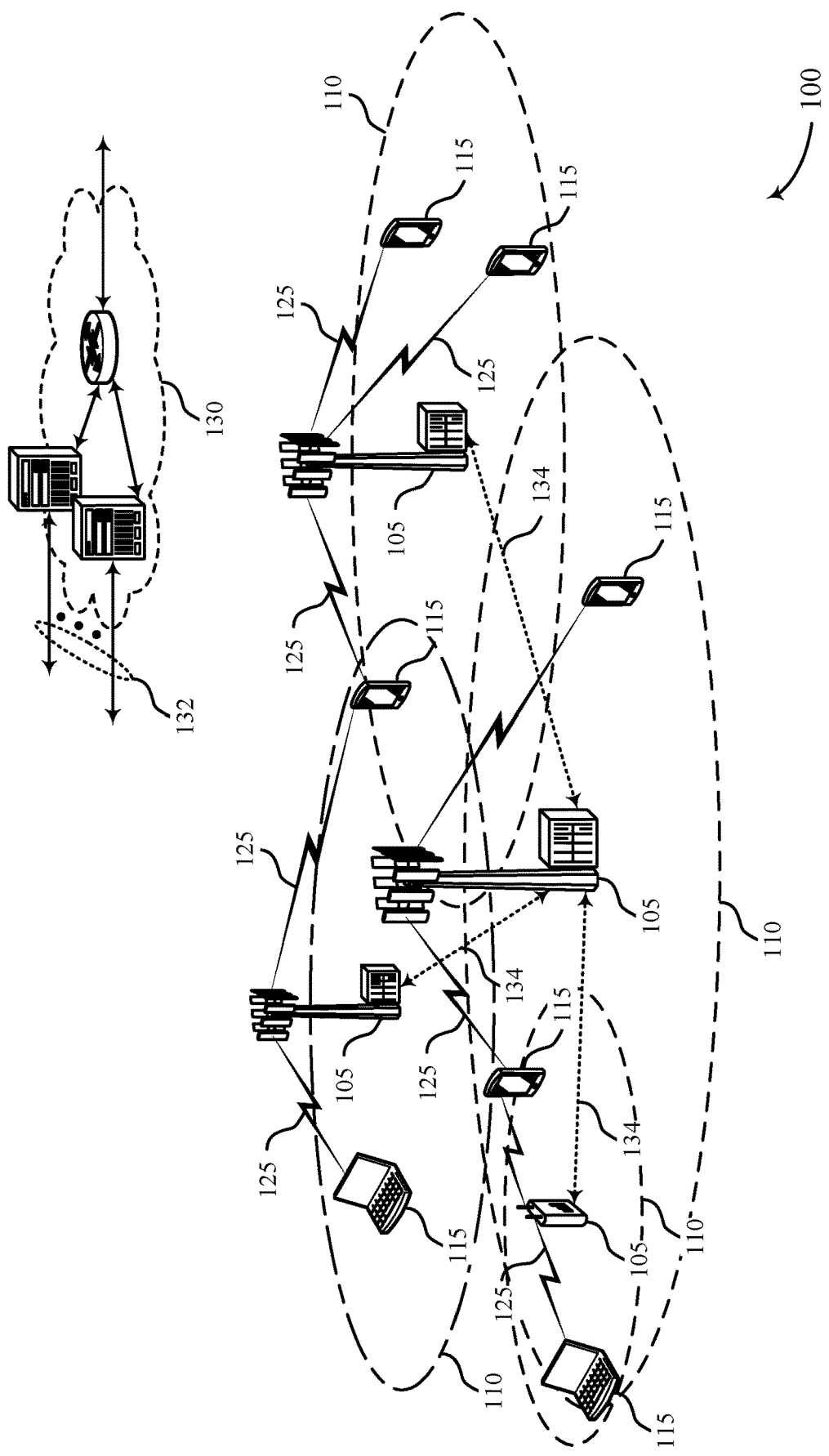
FIG. 1 illustrates an example of a wireless communications system that supports network-assisted scheduling for packet duplication in vehicle-based sidelink communication in accordance with aspects of the present disclosure.

Some wireless communications systems support packet data convergence protocol (PDCP) duplication, for example, for carrier aggregation (CA) and/or for dual-connectivity (DC). For example, in the CA scenario, a base station may configure two or more component carriers (CCs) to be used by the user equipment (UE), and the UE may duplicate the PDCP protocol data unit (PDU) packets on each carrier. Packet duplication may be used, for example, to improve reliability of the packet delivery.

Certain wireless communications systems may also support vehicle-based communications. The vehicle-based communications may include direct communications between a UE and a base station and/or may include sidelink communications between vehicle-based UEs. In some examples, the resources for the sidelink communications may be scheduled by the base station or may be preconfigured and used autonomously by the UEs. However, conventional wireless communications systems are not configured to support or otherwise allow packet duplications for vehicle-based sidelink communications using semi-persistent scheduling (SPS) resources.

Aspects of the disclosure are initially described in the context of a wireless communications system. Aspects of the present disclosure provide for implementation of signaling techniques between a base station and the vehicle-based UE that supports allocating SPS resources on a set of carrier frequencies to be used for vehicle-based sidelink communications involving packet duplication. For example, the UE may begin by sending a sidelink information message to the base station (e.g., a request) that signals its intention to perform vehicle-based sidelink communications. The sidelink information message may include or otherwise convey an indication of a traffic profile (e.g. a destination layer two identifier) as well as an indication of the allowed carrier frequency set for transmission and potential CA operations. The UE may also transmit an assistance information message (e.g., the request) to the base station to report a reliability metric associated with the traffic profile. The assistance information message (e.g., the request) may also include information associated with the traffic profile (e.g., an index associated with the traffic profile indicated in the sidelink information message). In some examples, the assistance information message (e.g., the request) may optionally include an indication of the number of carrier frequencies to be used for packet indication.

The base station may receive the request from the UE and respond with one or more grants. In some aspects, the grant may provide a rule by which the UE uses to determine the number of that a packets to be duplicated. In some examples, the rules may be based on the reliability metric associated with traffic profile. Accordingly, the UE may receive the one or more grants from the base station for SPS resources that have been allocated on the set of carrier frequencies and use these resources to perform vehicle-based sidelink communications using packet duplication.

Aspects of the disclosure are further illustrated by and described with reference to apparatus diagrams, system diagrams, and flowcharts that relate to network-assisted scheduling for packet duplication in vehicle-based sidelink communication.

FIG. 1 illustrates an example of a wireless communications system 100 that supports network-assisted scheduling for packet duplication in vehicle-based sidelink communication in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or PDCP layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency-division multiplexing (OFDM) or discrete Fourier transform-spread-OFDM (DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some aspects, a UE 115 may determine that a profile for vehicle-based sidelink communications supports packet duplication using a set of carrier frequencies. The UE 115 may transmit a request to a base station 105 for resources to use to perform the vehicle-based sidelink communications, the request comprising an indication of the profile, a reliability metric associated with the profile, and an identifier that identifies the set of carrier frequencies. The UE 115 may receive one or more grants from the base station 105 for SPS resources allocated on the set of carrier frequencies in response to the request.

A base station 105 may receive a request from a UE 115 for resources, the request comprising an indication of a profile for vehicle-based sidelink communications, a reliability metric associated with the profile, and an identifier that identifies a set of carrier frequencies to use for packet duplication during the vehicle-based sidelink communications. The base station 105 may transmit one or more grants to the UE 115 for SPS resources allocated on the set of carrier frequencies in response to the request.

Figure 2:
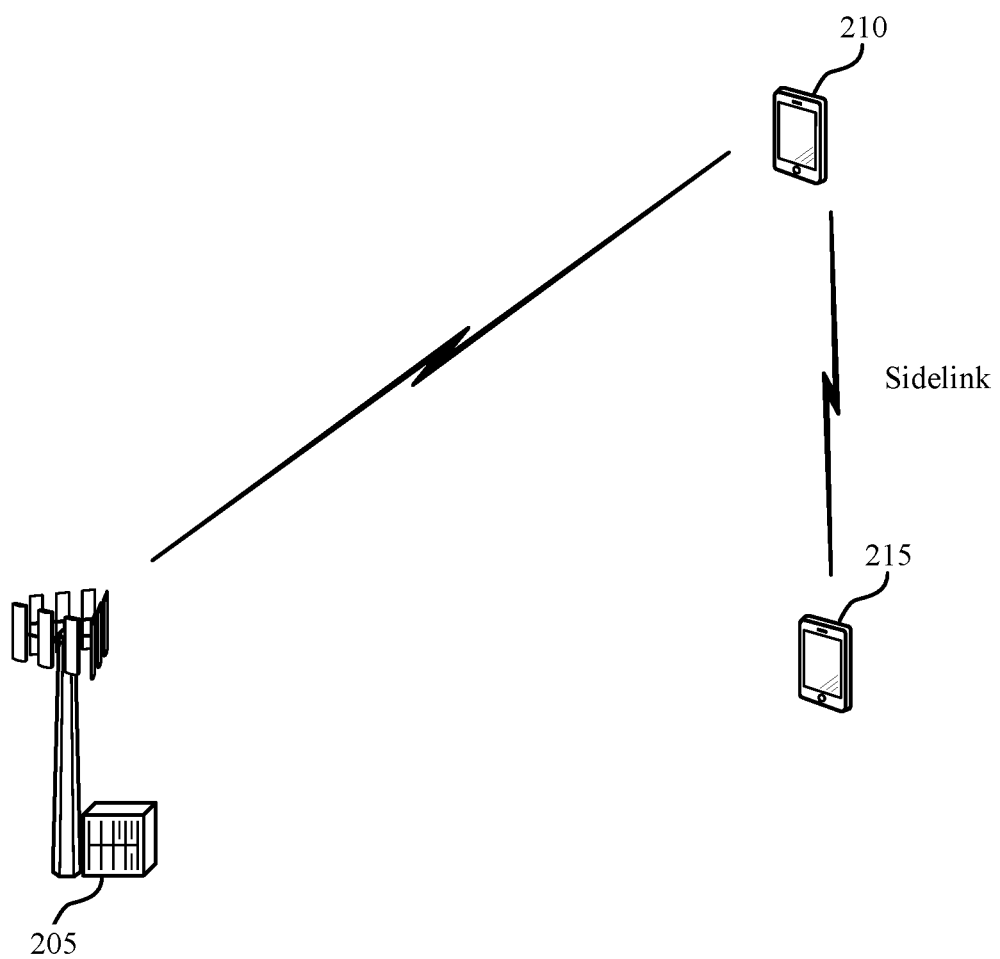
FIG. 2 illustrates an example of a wireless communications system that supports network-assisted scheduling for packet duplication in vehicle-based sidelink communication in accordance with aspects of the present disclosure.

FIG. 2 illustrates an example of a wireless communications system 200 that supports network-assisted scheduling for packet duplication in vehicle-based sidelink communication in accordance with aspects of the present disclosure. In some examples, wireless communications system 200 may implement aspects of wireless communications system 100. Wireless communications system 200 may include a base station 205, a UE 210, and a UE 215, which may be examples of the corresponding devices described herein.

Wireless communications system 200 may include or support networks used for vehicle-based communications, also referred to as vehicle-to-everything (V2X) networks, vehicle-to-vehicle (V2V) networks, and/or cellular V2X (C-V2X) networks. Vehicle-based communication networks may provide always-on telematics where UEs (e.g., vehicle UEs (v-UEs)) communicate directly to the network (e.g., via vehicle-to-network (V2N) communications), to pedestrian UEs (e.g., via vehicle-to-pedestrians (V2P) communications), to infrastructure devices (vehicle-to-infrastructure (V2I) communications), and to other v-UEs (e.g., via the network and/or directly via V2V communications).

Wireless communications system 200 may include or support packet duplication, such as PDCP PDU duplication. For example, packet duplication may be supported for CA based packet duplication. CA may include base station 205 aggregating two or more carriers (e.g., CCs) for the UEs 210 and/or 215, where the PDCP PDU is duplicated on each carrier. Generally, CA based packet duplication using multiple carriers may be used to improve the reliability of V2X packet delivery. For SPS, multiple SPS grants in at least two different carriers may be created by the base station 205 in order for the UEs 210 and/or 215 to send the same PDCP PDU using CA packet duplication during sidelink communications.

Generally, vehicle-based communications may be network controlled or autonomous. In a network controlled environment, base station 205 may schedule one or more resources for UEs 210 and/or 215 to use for vehicle-based communication. In an autonomous environment, resources may be preconfigured for UE 210 and/or 215 to use for vehicle-based communications.

In some aspects, communications between base station 205 and UEs 210 and/or 215 may be considered direct communications, whereas communications between UEs 210 and 215 may be considered sidelink communications. In the network controlled environment (or network assist environment), base station 205 may provide a grant of resources for vehicle-based sidelink communications. For example, base station 205 may provide sidelink grants for the vehicle-based sidelink communications.

In some aspects, wireless communications system 200 may also support SPS scheduling, where multiple SPS grants are provided for two or more carrier frequencies. For example, SPS scheduling may be utilized for certain traffic patterns, such as similarly sized data bursts that occur periodically.

Aspects of the described techniques provide for signaling between base station 205 and UE 210 (in this example, but could be between base station 205 and any other UE) that supports vehicle-based sidelink communications using packet duplication using a set of carrier frequencies. For example, UE 210 may identify a traffic profile for vehicle-based sidelink communications, where the traffic profile supports packet duplication using the set of carrier frequencies (e.g., CA based packet duplication). As one example, the traffic profile (or simply profile) may include a particular type of V2X service, such as an exchange of sensor data, speed information, location information, and the like. In some aspects, the profile may have an associated destination layer two identifier (or simply a destination identifier). In some aspects, UE 210 may provide an indication to base station 205 that it intends to perform the vehicle-based sidelink communications using packet duplication using a set of carrier frequencies.

Based on this determination, UE 210 may transmit a request to base station 205 asking for resources to be used to perform the vehicle-based sidelink communications. Broadly, the request may include or otherwise convey an indication of the profile, of a reliability metric associated with profile (such as a ProSe Per Packet Reliability (PPPR) indicator), and/or may identify or otherwise indicate the set of carrier frequencies. In some aspects, the request may be broken down or otherwise communicated in multiple messages from UE 210.

For example, UE 210 may transmit a sidelink information (SidelinkUEInformation) message to base station 205 that includes or otherwise provides an indication of the profile and the identifier for the set of carrier frequencies. The sidelink information message may include a list of each destination identifier (e.g., a destination layer two identifier) for the profile, where each destination identifier has an associated index value. The sidelink information message may include, for each destination identifier, an indication of the allowed carrier frequency set that UE 210 may use for transmission of the vehicle-based sidelink communications. The sidelink information message may include or otherwise convey an indication that UE 210 desires to perform the vehicle-based sidelink communications using packet duplication in a CA configuration.

As another example, UE 210 may transmit an assistance information (UEAssistanceInformation) message to base station 205 to report its traffic profile and indicate that the traffic profile supports SPS scheduling for the sidelink communications. In some aspects, the assistance information message may include or otherwise convey an index of the previously indicated destination identifiers, for example, an index for the destination identifiers that were indicated in the sidelink information message. In some aspects, the assistance information message may include or otherwise convey an indication of the reliability metric (e.g., a PPPR indicator). In some aspects, the assistance information message may be configured to include or otherwise provide an indication of a subset of carrier frequencies from the set of carrier frequencies that provides an indication of the number of carrier frequencies to be used for packet duplication. In some aspects, the assistance information message may include or otherwise provide an indication of the traffic pattern for the profile, offset information, priority value, and the like.

Base station 205 may receive the request for resources from UE 210 and determine whether, and, if so, how to support CA based packet duplication. In some aspects this may include base station 205 determining whether to support CA based packet duplication based on the reliability metric that is associated with each indicated traffic profile. For example, base station 205 may identify a threshold value for the vehicle-based sidelink communications and determine whether the reliability metric satisfies the threshold. If so, the base station 205 may determine to support the CA based packet duplication for UE 210 to perform the vehicle-based sidelink communications. In some aspects, base station 205 may identify the set of carrier frequencies that UE 210 will use for packet duplication based on the reliability metric satisfying the threshold and/or the availability a sidelink resources, such as an available set of carrier frequencies the base station 205 can allocate to UE 210.

Provided that base station 205 determines to support the CA based packet duplication for UE 210, base station 205 may transmit one or more grants to UE 210 for SPS resources that are allocated on the set of carrier frequencies. In some aspects, base station 205 may allocate multiple sidelink grants using a corresponding number of downlink control indicators (DCIs), where each DCI indicates the same SPS configuration index to activate the SPS resources for the packet duplication. In some aspects, base station 205 may transmit the one or more grants in a RRC message that includes or otherwise provides an indication of the SPS configuration for the set of carrier frequencies and a corresponding SPS index. For example, the SPS configuration may be associated with grants that match the profile for the vehicle-based sidelink communications.

Figure 3:
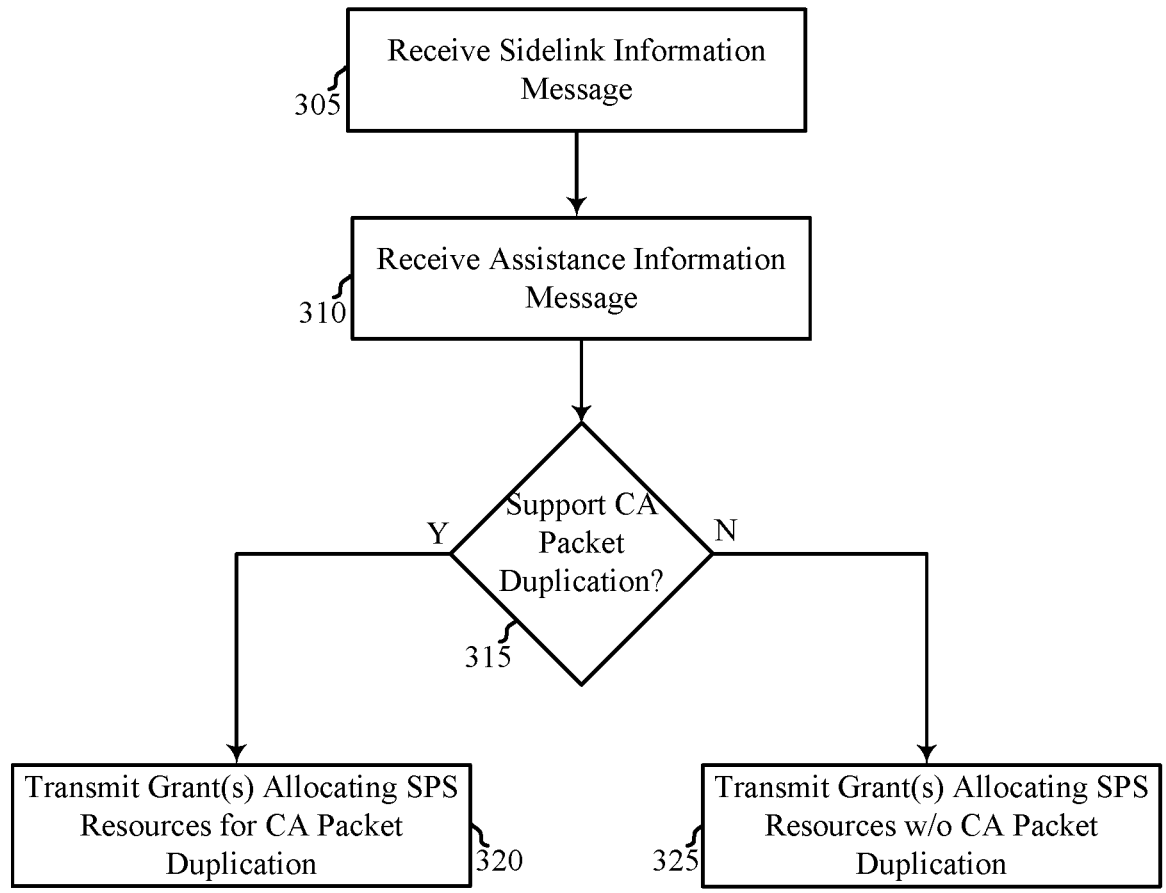
FIG. 3 illustrates an example of a method that supports network-assisted scheduling for packet duplication in vehicle-based sidelink communication in accordance with aspects of the present disclosure.

FIG. 3 illustrates an example of a method 300 that supports network-assisted scheduling for packet duplication in vehicle-based sidelink communication in accordance with aspects of the present disclosure. In some examples, method 300 may implement aspects of wireless communications systems 100/200. Aspects of method 300 may be implement a by a base station, which may be an example of the corresponding device described herein.

At 305, the base station may receive a sidelink information message from a UE. In some aspects, the sidelink information message includes or otherwise provides an indication of a traffic profile for vehicle-based sidelink communications that supports packet duplication using a set of carrier frequencies. In some aspects, the sidelink information message includes or otherwise provides an indication of an identifier that identifies a set of carrier frequencies.

In some aspects, the UE sends the sidelink information message (SidelinkUEinformation) to the base station to report its intention to transmit vehicle-based sidelink communications, the sidelink information message also including a list of destination layer two identifiers. For each destination layer two identifier, the UE indicates its allowed carrier frequency set for transmission and potential CA operation.

At 310, the base station may receive an assistance information message from the UE. In some aspects, the assistance information message includes or otherwise conveys an indication of a reliability metric. In some aspects, the assistance information message may include or otherwise convey an indication of an index value that is associated with the profile, for example, an index for the destination layer two identifier that was indicated in the sidelink information message. In some aspects, the UE may configure the assistance information message to indicate a subset of carrier frequencies from the set of carrier frequencies in order to indicate a number of carrier frequencies to use for packet duplication.

In some aspects, the UE sends the assistance information (UEAssistanceInformation) message to the base station to report its traffic profile (or simply profile) that may use SPS in the vehicle-based sidelink communications. This traffic profile may include the destination layer two identifier index (e.g., corresponding to the destination layer two identifier reported in SidelinkUEinformation). In some aspects, the assistance information message may indicate the associated traffic pattern of the UE, an offset, priority value (e.g., a Prose Per Packet Priority (PPPP) indicator), and the like. If the UE intends to use CA based packet duplication, the UE may also report the reliability metric (e.g., the PPPR value) associated with the traffic profile. In some aspects, the UE may suggest a number of carriers to be used for the packet duplication.

In some aspects, the sidelink information message and the assistance information message may comprise a request from the UE for resources to use for packet duplication during the vehicle-based sidelink communications.

At 315, the base station may determine whether to support CA packet duplication. In some aspects, the base station may make this determination based on the request received from the UE. In one example, the base station may identify a threshold value for the vehicle-based settling communications and make the determination of whether to support packet duplication based on the reliability metric satisfying the threshold value.

In some aspects, the base station may decide whether and how to support CA packet duplication based on the request message (e.g., the UE assistance information message). In one example this may include the base station using the PPPR threshold to determine an amount of data packets that need to be duplicated.

If base station decides to allow CA packet duplication, at 320 the base station may transmit one or more grants for SPS resources allocated on the set of carrier frequencies in response to the request. In some aspects, the base station may configure an SPS configuration information element in dedicated RRC signaling, (e.g., RRCConnectionReconfiguration). In some aspects, the RRC signaling may indicate an SPS index whose configuration contains multiple CC information, which allows the UE packets to be duplicated. Those CCs may be chosen by the base station to allow packet duplication. In some aspects, base station may allocate the UE multiple sidelink grants using multiple DCI-5A format signaling, with each DCI indicating the same SPS configuration index to activate the SPS(s) for the packet duplication.

If the base station decides not to allow CA packet duplication, at 325 the base station transmit one or more grants to the UE that allocates SPS resources, but without CA packet duplication. That is, the base station may allocate SPS resources for the UE to perform the vehicle-based sidelink communications, but may not allocate a set of carrier frequencies for packet duplication.

Figure 4:
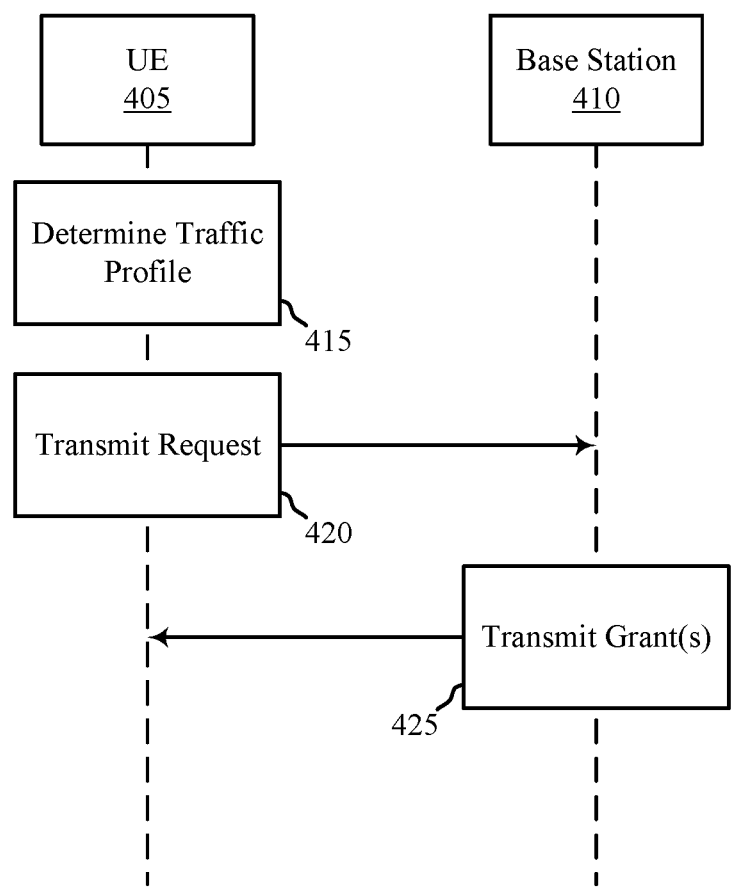
FIG. 4 illustrates an example of a process that supports network-assisted scheduling for packet duplication in vehicle-based sidelink communication in accordance with aspects of the present disclosure.

FIG. 4 illustrates an example of a process 400 that supports network-assisted scheduling for packet duplication in vehicle-based sidelink communication in accordance with aspects of the present disclosure. In some examples, process 400 may implement aspects of wireless communications systems 100/200 and/or method 300. Process 400 may include a UE 405 and a base station 410, which may be examples of the corresponding devices described herein.

At 415, UE 405 may determine that a profile for vehicle-based sidelink communications supports packet duplication using a set of carrier frequencies. In some aspects, UE 405 may identify a destination identifier for the vehicle-based communications (e.g. a destination layer two identifier). In some aspects, the profile may be based on the destination identifier.

At 420, UE 405 may transmit (and base station 410 may receive) a request to base station 410 for resources to use to perform the vehicle-based sidelink communications. In some aspects, the request may include or otherwise provide an indication of the profile, reliability metric associated with the profile, and an identifier that identifies a set of carrier frequencies. In some aspects, UE 405 may transmit a signal to base station 410 indicating the packet duplication is supported using the set of carrier frequencies.

In some aspects, UE 405 may transmit the indication of the profile and the identifier in a sidelink information message. In some aspects, UE 405 may transmit the indication of the reliability metric and an index value associated with the profile in an assistance information message. In some examples, the assistance information message may indicate a subset of carrier frequencies of the set of carrier frequencies to provide an indication of the number of carrier frequencies to use for packet duplication.

In some aspects, base station 410 may determine whether to support the request for packet duplication for the vehicle-based sidelink communications for UE 405. The one or more grants may be configured based on that determination. In some examples, base station 410 may make the determination by identifying a threshold value for the vehicle-based sidelink communications and then determining whether the reliability metric satisfies the threshold value.

At 425, base station 410 may transmit (and UE 405 may receive) one or more grants for SPS resources allocated on the set of carrier frequencies in response to the request. In some aspects, the one or more grants may be communicated in one or more DCIs from base station 410. In some aspects, two or more of the grants may contain an indication of the same SPS index.

In some aspects, base station 410 may configure an RRC message to indicate an SPS configuration associated with the set of carrier frequencies to use for packet duplication, and a corresponding SPS index. In some examples, the SPS configuration may be associated with one or more grants that match the profile of the vehicle-based sidelink communications.

Figure 5:
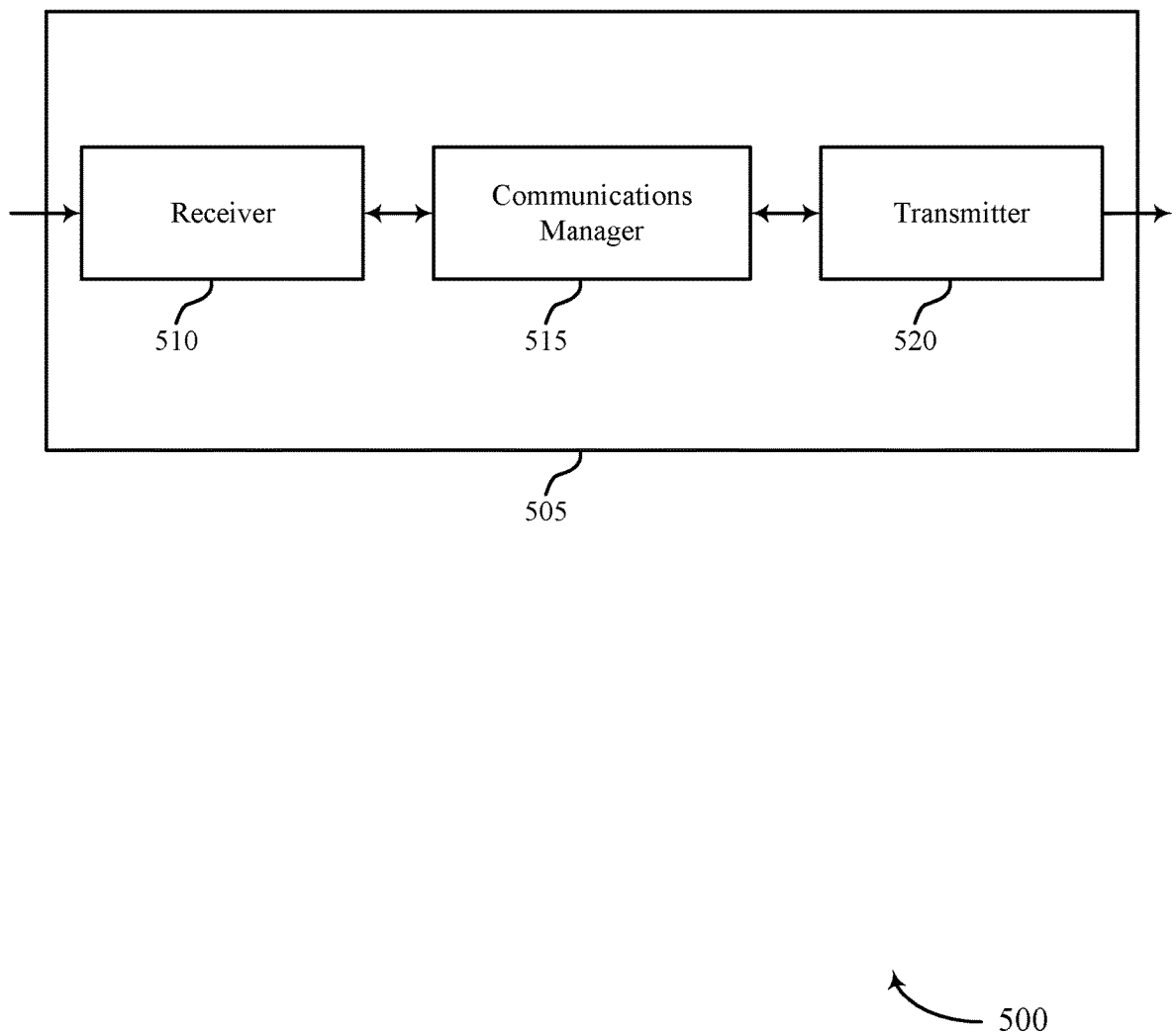
FIGS. 5 and 6 show block diagrams of user equipments (UEs) that support network-assisted scheduling for packet duplication in vehicle-based sidelink communication in accordance with aspects of the present disclosure.

FIG. 5 shows a block diagram 500 of a UE 505 that supports network-assisted scheduling for packet duplication in vehicle-based sidelink communication in accordance with aspects of the present disclosure. UE 505 may be an example of aspects of a UE 115 as described herein. UE 505 may include receiver 510, communications manager 515, and transmitter 520. UE 505 may also include a processor. Each of these components may be in communication with one another (e.g., via one or more buses).

Receiver 510 may receive information such as packets, user data, or control information associated with various information channels (e.g., control channels, data channels, and information related to network-assisted scheduling for packet duplication in vehicle-based sidelink communication, etc.). Information may be passed on to other components of the device. The receiver 510 may be an example of aspects of the transceiver 820 described with reference to FIG. 8. The receiver 510 may utilize a single antenna or a set of antennas.

Communications manager 515 may be an example of aspects of the communications manager 810 described with reference to FIG. 8.

Communications manager 515 and/or at least some of its various sub-components may be implemented in hardware, software executed by a processor, firmware, or any combination thereof. If implemented in software executed by a processor, the functions of the communications manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The communications manager 515 and/or at least some of its various sub-components may be physically located at various positions, including being distributed such that portions of functions are implemented at different physical locations by one or more physical devices. In some examples, communications manager 515 and/or at least some of its various sub-components may be a separate and distinct component in accordance with various aspects of the present disclosure. In other examples, communications manager 515 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Communications manager 515 may determine that a profile for vehicle-based sidelink communications supports packet duplication using a set of carrier frequencies. Communications manager 515 may transmit a request to a base station for resources to use to perform the vehicle-based sidelink communications, the request including an indication of the profile, a reliability metric associated with the profile, and an identifier that identifies the set of carrier frequencies. Communications manager 515 may receive one or more grants from the base station for SPS resources allocated on the set of carrier frequencies in response to the request.

Transmitter 520 may transmit signals generated by other components of the device. In some examples, the transmitter 520 may be collocated with a receiver 510 in a transceiver. For example, the transmitter 520 may be an example of aspects of the transceiver 820 described with reference to FIG. 8. The transmitter 520 may utilize a single antenna or a set of antennas.

Figure 6:
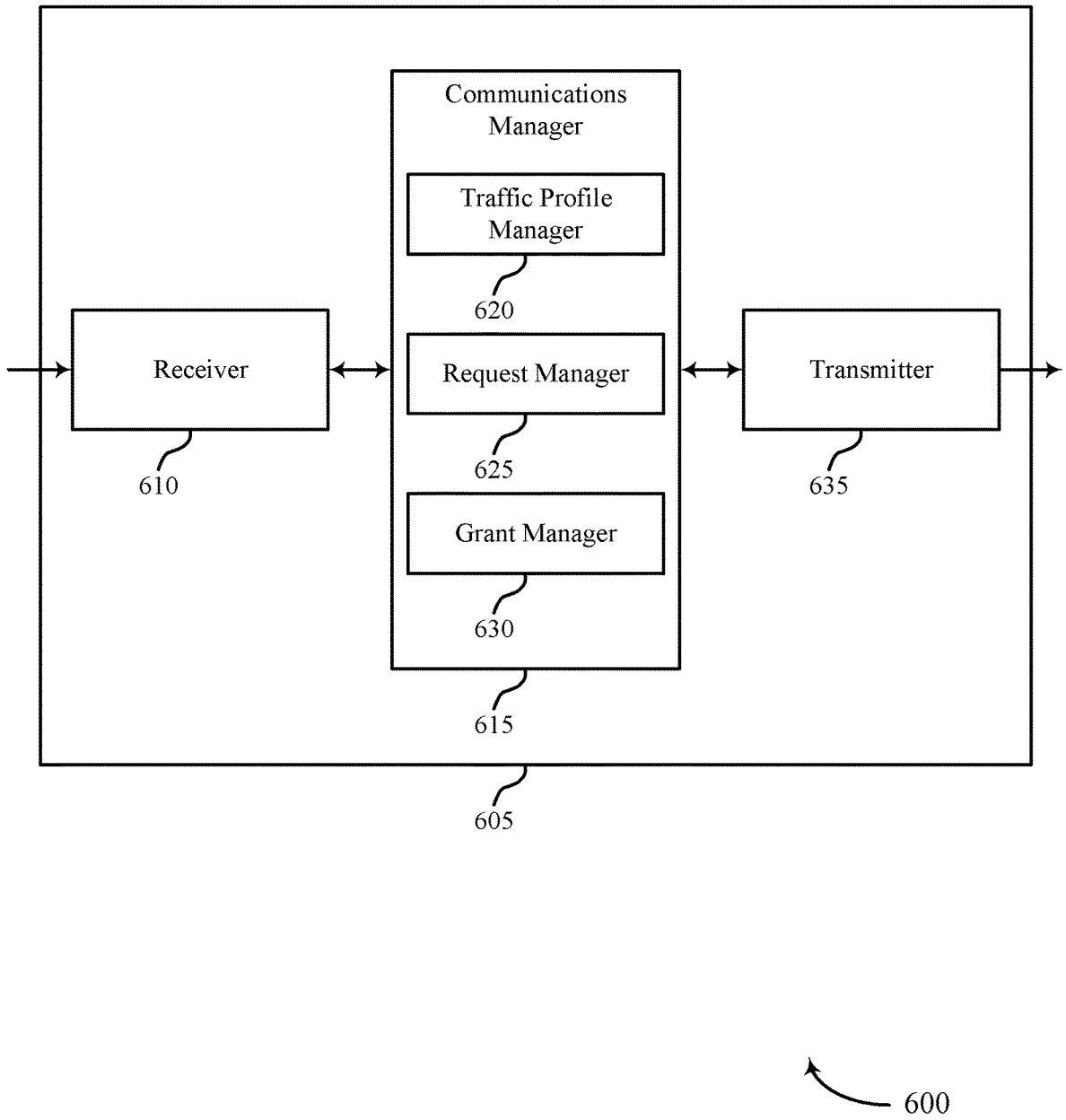

FIG. 6 shows a block diagram 600 of a UE 605 that supports network-assisted scheduling for packet duplication in vehicle-based sidelink communication in accordance with aspects of the present disclosure. UE 605 may be an example of a UE 115 as described herein, including, for example, aspects of UE 505 as described with reference to FIG. 5. UE 605 may include receiver 610, communications manager 615, and transmitter 635. UE 605 may also include a processor. Each of these components may be in communication with one another (e.g., via one or more buses).

Receiver 610 may receive information such as packets, user data, or control information associated with various information channels (e.g., control channels, data channels, and information related to network-assisted scheduling for packet duplication in vehicle-based sidelink communication, etc.). Information may be passed on to other components of the device. The receiver 610 may be an example of aspects of the transceiver 820 described with reference to FIG. 8. The receiver 610 may utilize a single antenna or a set of antennas.

Communications manager 615 may be an example of aspects of the communications manager 810 described with reference to FIG. 8. Communications manager 615 may also include traffic profile manager 620, request manager 625, and grant manager 630.

Traffic profile manager 620 may determine that a profile for vehicle-based sidelink communications supports packet duplication using a set of carrier frequencies.

Request manager 625 may transmit a request to a base station for resources to use to perform the vehicle-based sidelink communications, the request including an indication of the profile, a reliability metric associated with the profile, and an identifier that identifies the set of carrier frequencies.

Grant manager 630 may receive one or more grants from the base station for SPS resources allocated on the set of carrier frequencies in response to the request.

Transmitter 635 may transmit signals generated by other components of the device. In some examples, the transmitter 635 may be collocated with a receiver 610 in a transceiver. For example, the transmitter 635 may be an example of aspects of the transceiver 820 described with reference to FIG. 8. The transmitter 635 may utilize a single antenna or a set of antennas.

Figure 7:
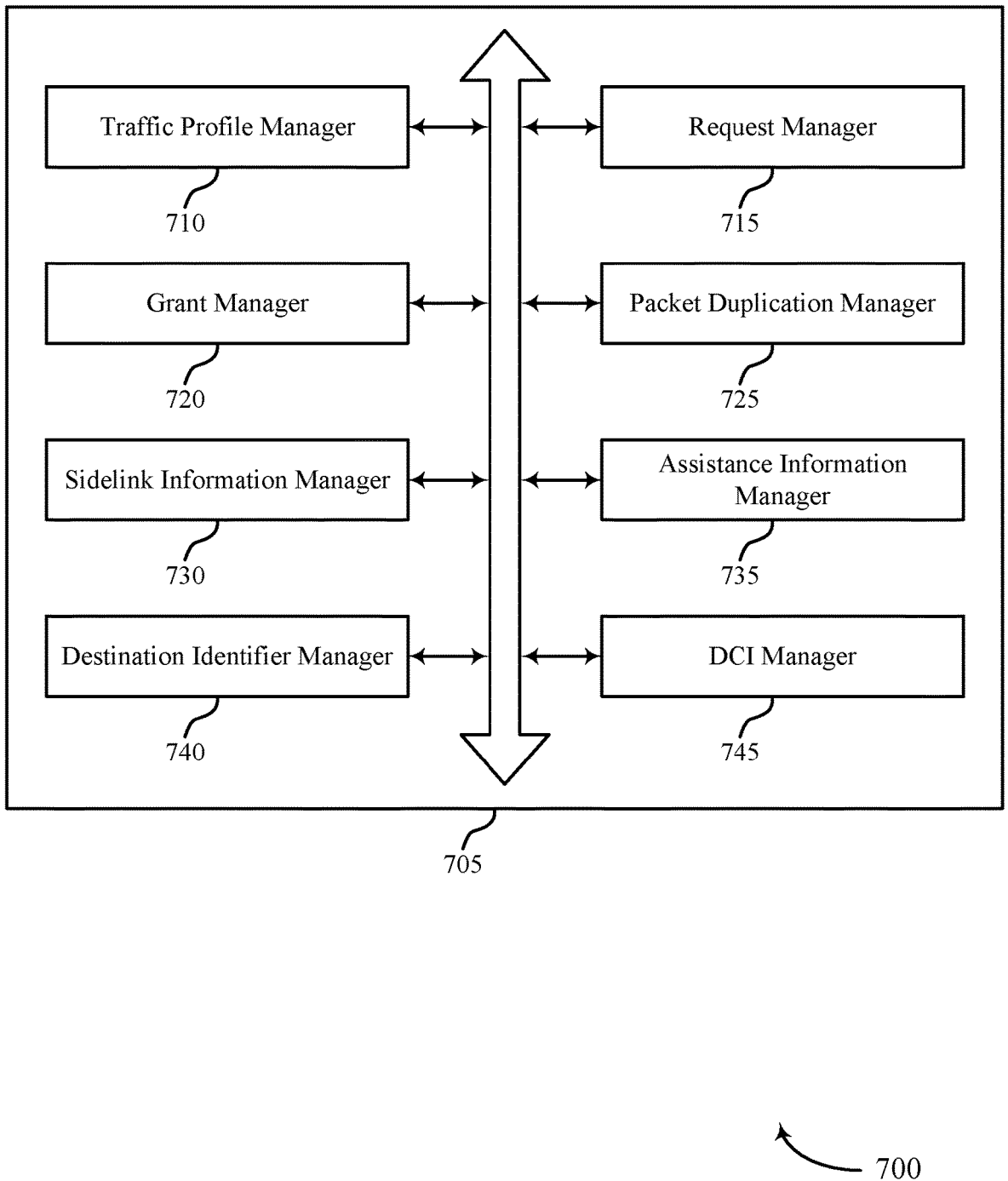
FIG. 7 shows a block diagram of a communications manager that supports network-assisted scheduling for packet duplication in vehicle-based sidelink communication in accordance with aspects of the present disclosure.

FIG. 7 shows a block diagram 700 of a communications manager 705 that supports network-assisted scheduling for packet duplication in vehicle-based sidelink communication in accordance with aspects of the present disclosure. The communications manager 705 may be an example of aspects of a communications manager 515, a communications manager 615, or a communications manager 810 described with reference to FIGS. 5, 6, and 8. The communications manager 705 may include traffic profile manager 710, request manager 715, grant manager 720, packet duplication manager 725, sidelink information manager 730, assistance information manager 735, destination identifier manager 740, and DCI manager 745. Each of these components may communicate, directly or indirectly, with one another (e.g., via one or more buses).

The traffic profile manager 710 may determine that a profile for vehicle-based sidelink communications supports packet duplication using a set of carrier frequencies.

The request manager 715 may transmit a request to a base station for resources to use to perform the vehicle-based sidelink communications, the request including an indication of the profile, a reliability metric associated with the profile, and an identifier that identifies the set of carrier frequencies.

The grant manager 720 may receive one or more grants from the base station for SPS resources allocated on the set of carrier frequencies in response to the request.

The packet duplication manager 725 may transmit a signal indicating that packet duplication is supported using the set of carrier frequencies.

The sidelink information manager 730 may transmit a sidelink information message to the base station to indicate the profile and the identifier.

The assistance information manager 735 may transmit an assistance information message to the base station to indicate the reliability metric, the assistance information message including an index value associated with the profile. In some examples, the assistance information manager 735 may configure the assistance information message to indicate a subset of carrier frequencies of the set of carrier frequencies to indicate the number of carrier frequencies to use for packet duplication.

The destination identifier manager 740 may identify a destination identifier for the vehicle-based sidelink communications, where the profile is based on the destination identifier.

The DCI manager 745 may receive the one or more grants in one or more DCIs from the base station. In some examples, the DCI manager 745 may receive more than one grant containing the same SPS index.

Figure 8:
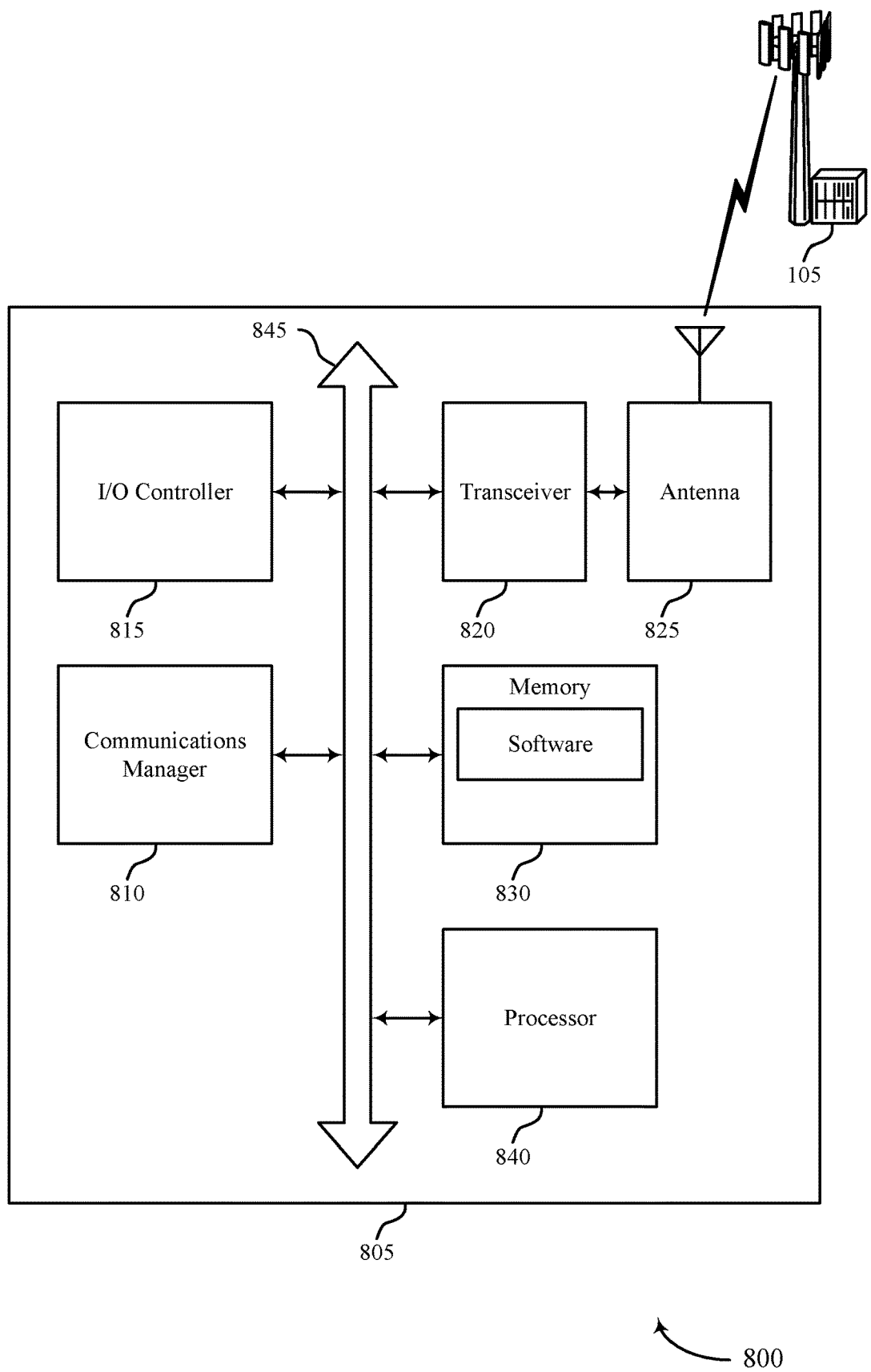
FIG. 8 shows a block diagram of a system including a device that supports network-assisted scheduling for packet duplication in vehicle-based sidelink communication in accordance with aspects of the present disclosure.

FIG. 8 shows a block diagram of a system 800 including a device 805 that supports network-assisted scheduling for packet duplication in vehicle-based sidelink communication in accordance with aspects of the present disclosure. Device 805 may be an example of a UE 115 as described herein, or include the components of, for example, UE 505 and UE 605, as described with reference to FIGS. 5 and 6. Device 805 may include components for bi-directional voice and data communications including components for transmitting and receiving communications, including communications manager 810, I/O controller 815, transceiver 820, antenna 825, memory 830, and processor 840. These components may be in electronic communication via one or more buses (e.g., bus 845).

I/O controller 815 may manage input and output signals for device 805. I/O controller 815 may also manage peripherals not integrated into device 805. In some cases, I/O controller 815 may represent a physical connection or port to an external peripheral. In some cases, I/O controller 815 may utilize an operating system such as iOS®, ANDROID®, MS-DOS®, MS-WINDOWS®, OS/2®, UNIX®, LINUX®, or another known operating system. In other cases, I/O controller 815 may represent or interact with a modem, a keyboard, a mouse, a touchscreen, or a similar device. In some cases, I/O controller 815 may be implemented as part of a processor. In some cases, a user may interact with device 805 via I/O controller 815 or via hardware components controlled by I/O controller 815.

Transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

Memory 830 may include random-access memory (RAM) and read-only memory (ROM). The memory 830 may store computer-readable, computer-executable software 835 including instructions that, when executed, cause the processor to perform various functions described herein. In some cases, the memory 830 may contain, among other things, a Basic Input/Output System (BIOS) which may control basic hardware or software operation such as the interaction with peripheral components or devices.

Processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 840 may be configured to operate a memory array using a memory controller. In other cases, a memory controller may be integrated into processor 840. Processor 840 may be configured to execute computer-readable instructions stored in a memory to perform various functions (e.g., functions or tasks supporting network-assisted scheduling for packet duplication in vehicle-based sidelink communication).

Figure 9:
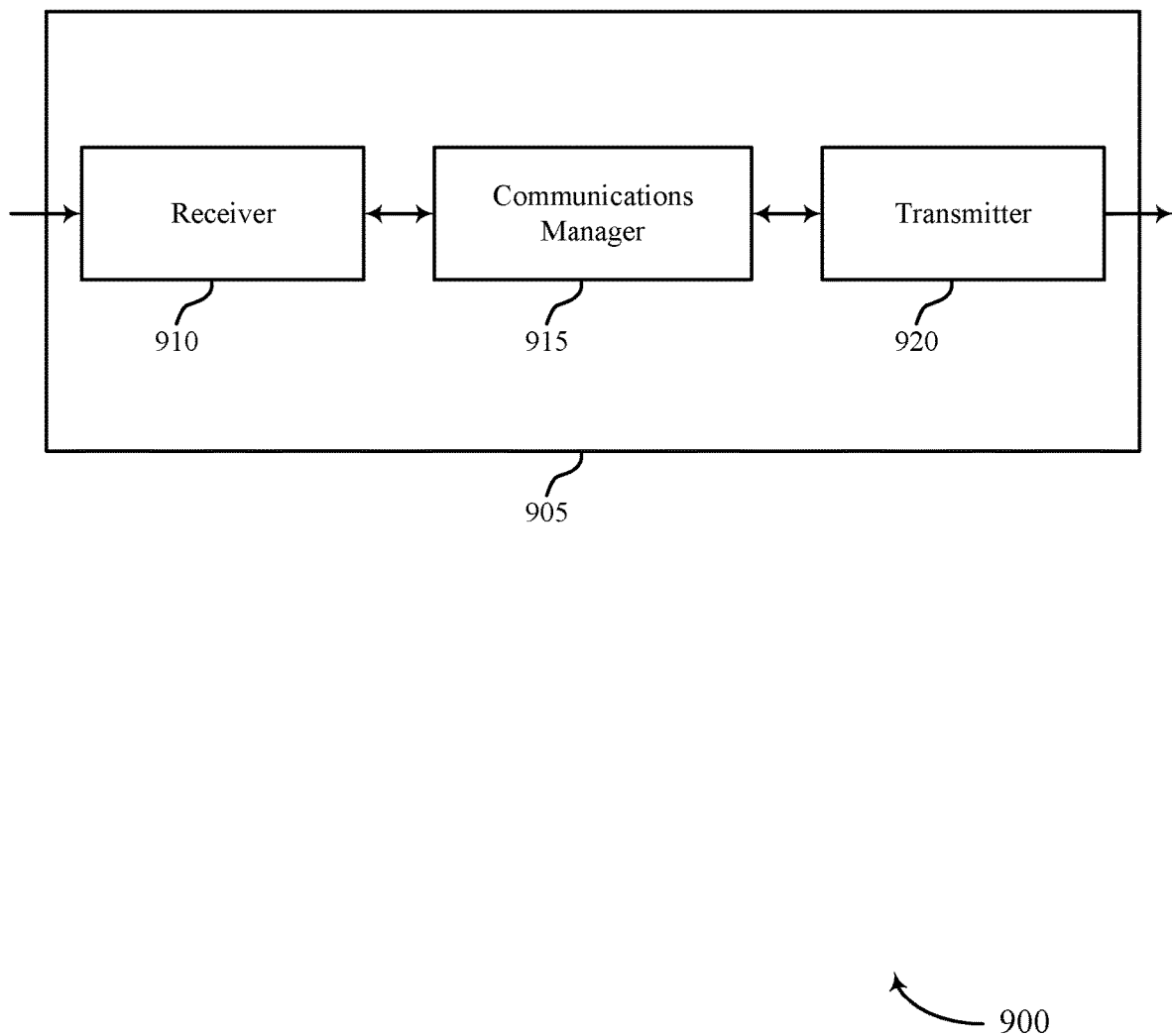
FIGS. 9 and 10 show block diagrams of base stations that support network-assisted scheduling for packet duplication in vehicle-based sidelink communication in accordance with aspects of the present disclosure.

FIG. 9 shows a block diagram 900 of a base station 905 that supports network-assisted scheduling for packet duplication in vehicle-based sidelink communication in accordance with aspects of the present disclosure. Base station 905 may be an example of aspects of a base station 105 as described herein. Base station 905 may include receiver 910, communications manager 915, and transmitter 920. Base station 905 may also include a processor. Each of these components may be in communication with one another (e.g., via one or more buses).

Receiver 910 may receive information such as packets, user data, or control information associated with various information channels (e.g., control channels, data channels, and information related to network-assisted scheduling for packet duplication in vehicle-based sidelink communication, etc.). Information may be passed on to other components of the device. The receiver 910 may be an example of aspects of the transceiver 1220 described with reference to FIG. 12. The receiver 910 may utilize a single antenna or a set of antennas.

Communications manager 915 may be an example of aspects of the communications manager 1210 described with reference to FIG. 12.

Communications manager 915 and/or at least some of its various sub-components may be implemented in hardware, software executed by a processor, firmware, or any combination thereof. If implemented in software executed by a processor, the functions of the communications manager 915 and/or at least some of its various sub-components may be executed by a general-purpose processor, a DSP, an ASIC, a FPGA or other programmable logic device, discrete gate or transistor logic, discrete hardware components, or any combination thereof designed to perform the functions described in the present disclosure. The communications manager 915 and/or at least some of its various sub-components may be physically located at various positions, including being distributed such that portions of functions are implemented at different physical locations by one or more physical devices. In some examples, communications manager 915 and/or at least some of its various sub-components may be a separate and distinct component in accordance with various aspects of the present disclosure. In other examples, communications manager 915 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Communications manager 915 may receive a request from a UE for resources, the request including an indication of a profile for vehicle-based sidelink communications, a reliability metric associated with the profile, and an identifier that identifies a set of carrier frequencies to use for packet duplication during the vehicle-based sidelink communications. Communications manager 915 may transmit one or more grants to the UE for SPS resources allocated on the set of carrier frequencies in response to the request.

Transmitter 920 may transmit signals generated by other components of the device. In some examples, the transmitter 920 may be collocated with a receiver 910 in a transceiver. For example, the transmitter 920 may be an example of aspects of the transceiver 1220 described with reference to FIG. 12. The transmitter 920 may utilize a single antenna or a set of antennas.

Figure 10:
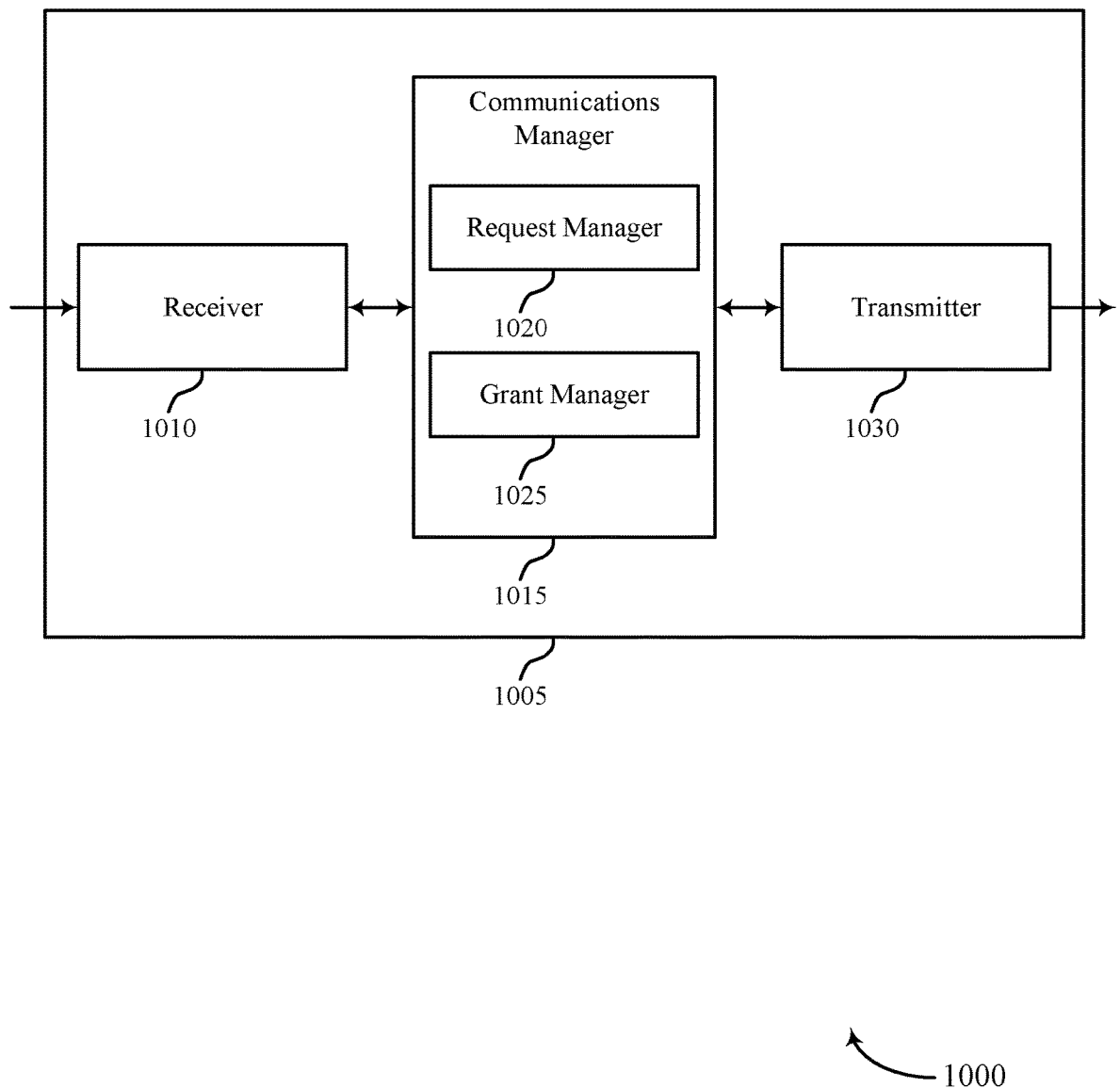

FIG. 10 shows a block diagram 1000 of a base station 1005 that supports network-assisted scheduling for packet duplication in vehicle-based sidelink communication in accordance with aspects of the present disclosure. Base station 1005 may be an example of a base station 115 as described herein or include aspects of, for example, a base station 905 as described with reference to FIG. 9. Base station 1005 may include receiver 1010, communications manager 1015, and transmitter 1030. Base station 1005 may also include a processor. Each of these components may be in communication with one another (e.g., via one or more buses).

Receiver 1010 may receive information such as packets, user data, or control information associated with various information channels (e.g., control channels, data channels, and information related to network-assisted scheduling for packet duplication in vehicle-based sidelink communication, etc.). Information may be passed on to other components of the device. The receiver 1010 may be an example of aspects of the transceiver 1220 described with reference to FIG. 12. The receiver 1010 may utilize a single antenna or a set of antennas.

Communications manager 1015 may be an example of aspects of the communications manager 1210 described with reference to FIG. 12.

Communications manager 1015 may also include request manager 1020 and grant manager 1025.

Request manager 1020 may receive a request from a UE for resources, the request including an indication of a profile for vehicle-based sidelink communications, a reliability metric associated with the profile, and an identifier that identifies a set of carrier frequencies to use for packet duplication during the vehicle-based sidelink communications.

Grant manager 1025 may transmit one or more grants to the UE for SPS resources allocated on the set of carrier frequencies in response to the request.

Transmitter 1030 may transmit signals generated by other components of the device. In some examples, the transmitter 1030 may be collocated with a receiver 1010 in a transceiver. For example, the transmitter 1030 may be an example of aspects of the transceiver 1220 described with reference to FIG. 12. The transmitter 1030 may utilize a single antenna or a set of antennas.

Figure 11:
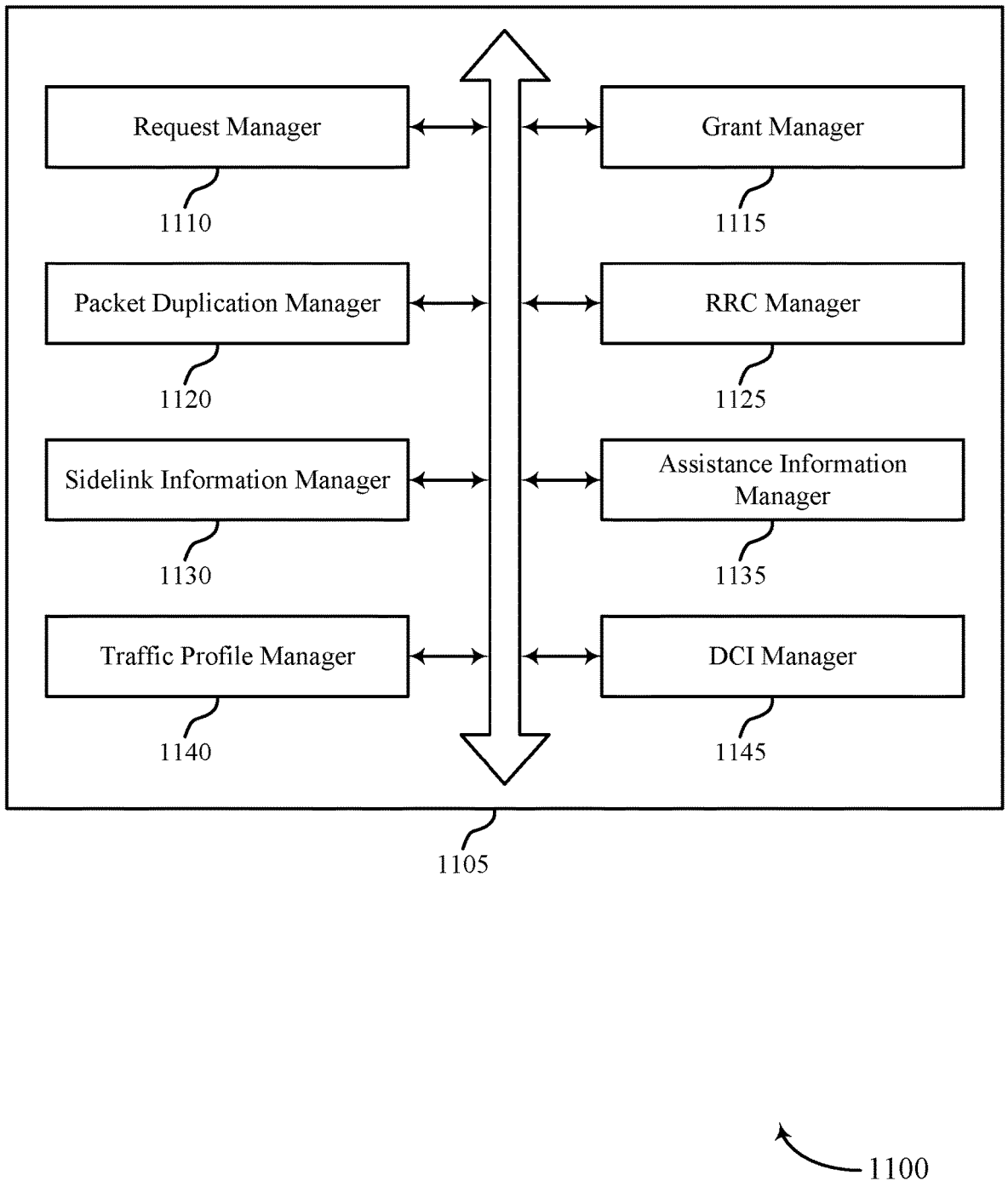
FIG. 11 shows a block diagram of a communications manager that supports network-assisted scheduling for packet duplication in vehicle-based sidelink communication in accordance with aspects of the present disclosure.

FIG. 11 shows a block diagram 1100 of a communications manager 1105 that supports network-assisted scheduling for packet duplication in vehicle-based sidelink communication in accordance with aspects of the present disclosure. The communications manager 1105 may be an example of aspects of a communications manager 915, a communications manager 1015, or a communications manager 1210 described with reference to FIGS. 9, 10, and 12. The communications manager 1105 may include request manager 1110, grant manager 1115, packet duplication manager 1120, RRC manager 1125, sidelink information manager 1130, assistance information manager 1135, traffic profile manager 1140, and DCI manager 1145. Each of these components may communicate, directly or indirectly, with one another (e.g., via one or more buses).

The request manager 1110 may receive a request from a UE for resources, the request including an indication of a profile for vehicle-based sidelink communications, a reliability metric associated with the profile, and an identifier that identifies a set of carrier frequencies to use for packet duplication during the vehicle-based sidelink communications.

The grant manager 1115 may transmit one or more grants to the UE for SPS resources allocated on the set of carrier frequencies in response to the request.

The packet duplication manager 1120 may determine, based on the request, whether to support packet duplication for the vehicle-based sidelink communications, where the one or more grants are configured based on the determination.

In some examples, the packet duplication manager 1120 may identify a threshold value for the vehicle-based sidelink communications, where the determination of whether to support packet duplication is based on the reliability metric satisfying the threshold.

In some examples, the packet duplication manager 1120 may identify the set of carrier frequencies to use for packet duplication based on at least one of the reliability metric satisfying the threshold, or an availability of a sidelink resource, or a combination thereof.

In some examples, the packet duplication manager 1120 may receive a signal indicating that packet duplication is supported using the set of carrier frequencies.

The RRC manager 1125 may configure a RRC message to indicate an SPS configuration associated with the set of carrier frequencies to use for packet duplication and a corresponding SPS index.

In some examples, the RRC manager 1125 may in some cases, the SPS configuration is associated with one or more grants matching the profile for the vehicle-based sidelink communications.

The sidelink information manager 1130 may receive a sidelink information message from the UE indicating the profile and the identifier.

The assistance information manager 1135 may receive an assistance information message from the UE indicating the reliability metric, the assistance information message including an index value associated with the profile.

In some examples, the assistance information manager 1135 may decode the assistance information message to identify a subset of carrier frequencies of the set of carrier frequencies that indicates the number of carrier frequencies to use for packet duplication.

The traffic profile manager 1140 may manage one or more aspects of the profile. In some examples, the traffic profile manager 1140 may in some cases, determine that the profile is based on a destination identifier associated with the vehicle-based sidelink communications.

The DCI manager 1145 may transmit the one or more grants in one or more DCIs containing an SPS index.

Figure 12:
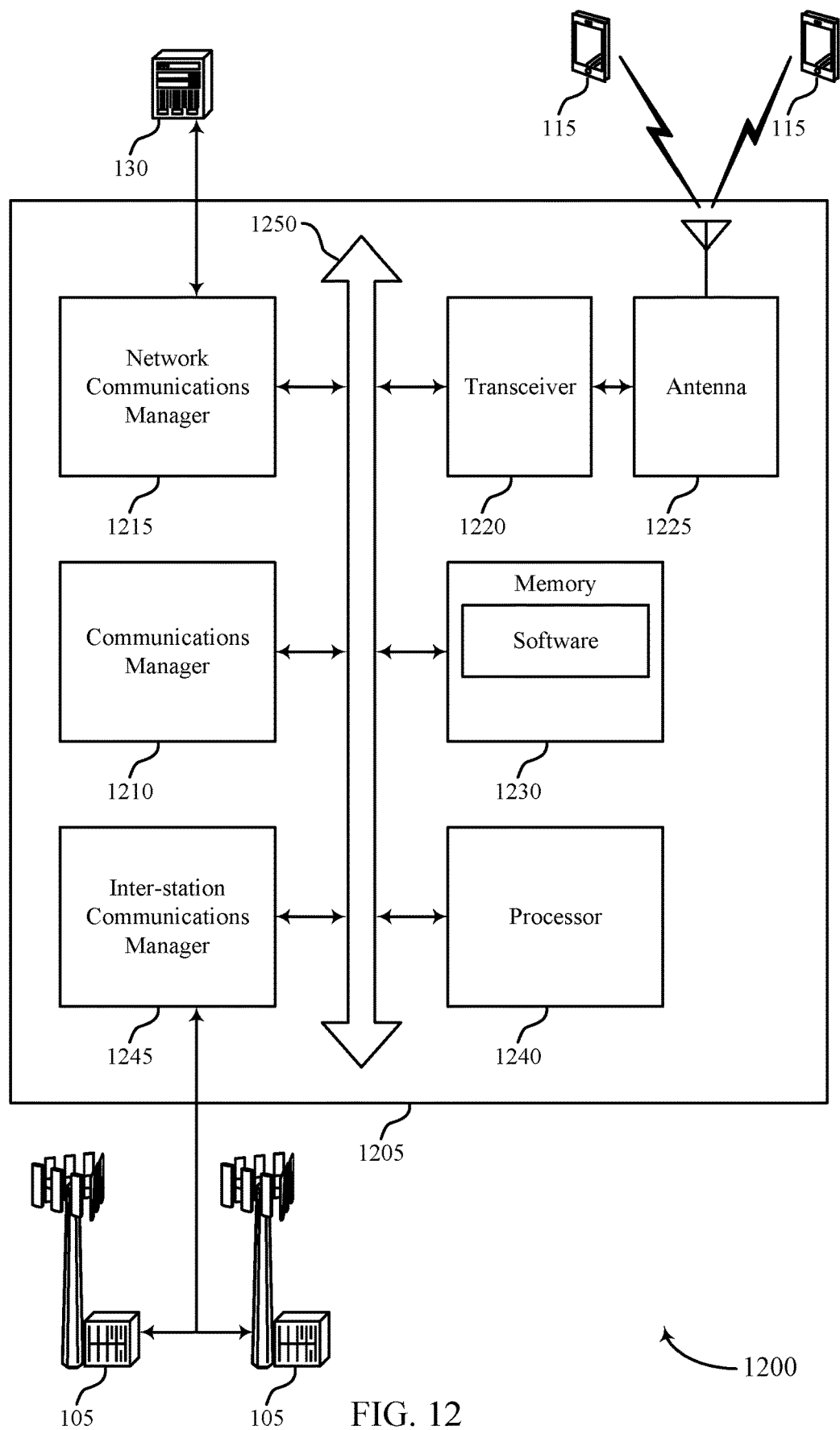
FIG. 12 shows a block diagram of a system including a device that supports network-assisted scheduling for packet duplication in vehicle-based sidelink communication in accordance with aspects of the present disclosure.

FIG. 12 shows a block diagram of a system 1200 including a device 1205 that supports network-assisted scheduling for packet duplication in vehicle-based sidelink communication in accordance with aspects of the present disclosure. Device 1205 may be an example of a base station 105 as described herein, or include aspects of, for example, base station 905 and base station 1005, as described with reference to FIGS. 9 and 10. Device 1205 may include components for bi-directional voice and data communications including components for transmitting and receiving communications, including communications manager 1210, network communications manager 1215, transceiver 1220, antenna 1225, memory 1230, processor 1240, and inter-station communications manager 1245. These components may be in electronic communication via one or more buses (e.g., bus 1250).

Network communications manager 1215 may manage communications with the core network (e.g., via one or more wired backhaul links). For example, the network communications manager 1215 may manage the transfer of data communications for client devices, such as one or more UEs 115.

Transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

Memory 1230 may include RAM and ROM. The memory 1230 may store computer-readable, computer-executable software 1235 including instructions that, when executed, cause the processor to perform various functions described herein. In some cases, the memory 1230 may contain, among other things, a BIOS which may control basic hardware or software operation such as the interaction with peripheral components or devices.

Processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1240 may be configured to operate a memory array using a memory controller. In other cases, a memory controller may be integrated into processor 1240. Processor 1240 may be configured to execute computer-readable instructions stored in a memory to perform various functions (e.g., functions or tasks supporting network-assisted scheduling for packet duplication in vehicle-based sidelink communication).

Inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, inter-station communications manager 1245 may provide an X2 interface within an LTE/LTE-A wireless communication network technology to provide communication between base stations 105.

Figure 13:
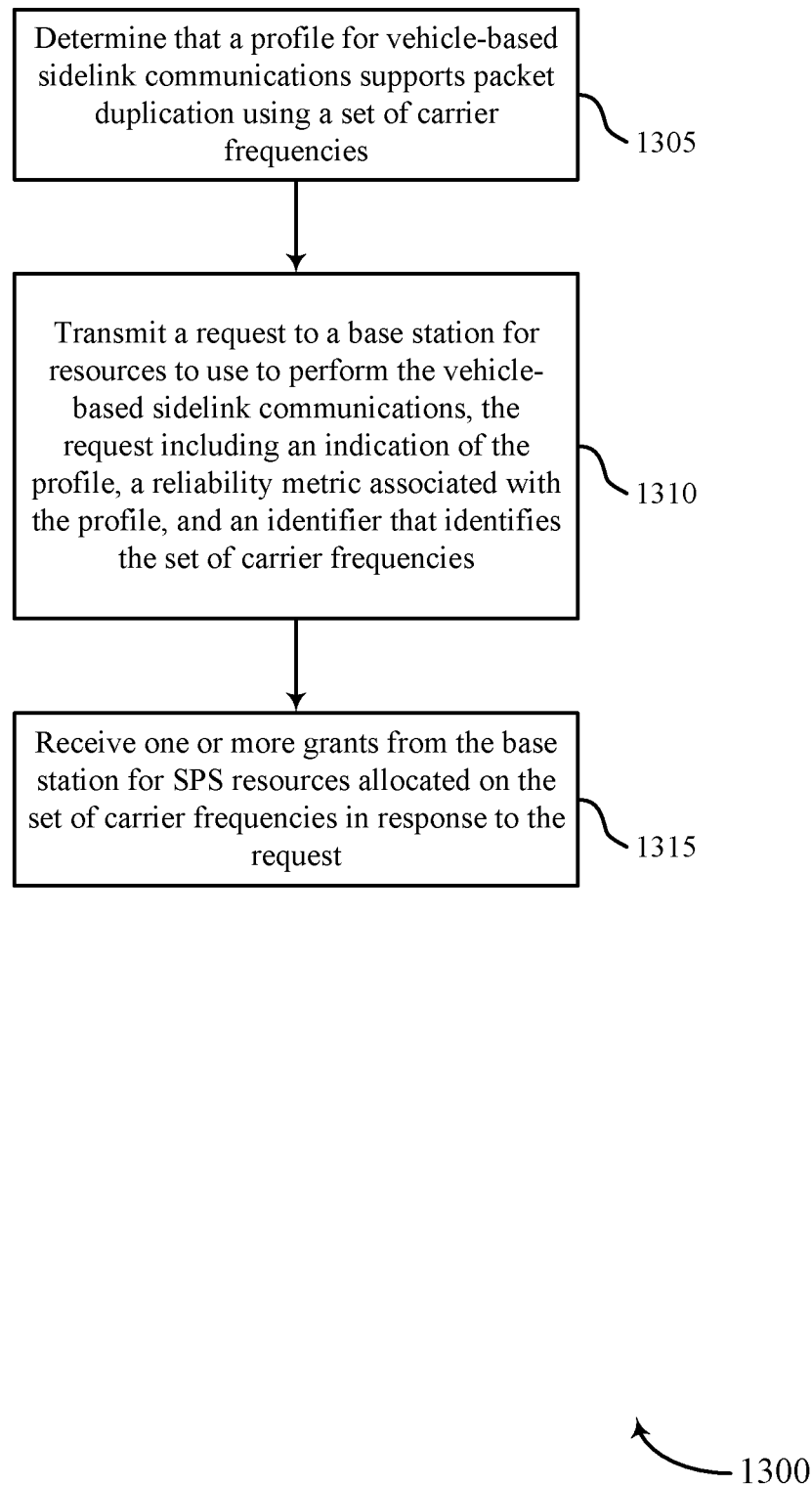
FIGS. 13 through 15 show flowcharts illustrating methods for network-assisted scheduling for packet duplication in vehicle-based sidelink communication in accordance with aspects of the present disclosure.

FIG. 13 shows a flowchart illustrating a method 1300 for network-assisted scheduling for packet duplication in vehicle-based sidelink communication in accordance with aspects of the present disclosure. The operations of method 1300 may be implemented by a UE or its components as described herein. For example, the operations of method 1300 may be performed by a communications manager as described with reference to FIGS. 5 through 8. In some examples, a UE may execute a set of codes to control the functional elements of the device to perform the functions described below. Additionally or alternatively, the UE may perform aspects of the functions described below using special-purpose hardware.

At 1305 the UE may determine that a profile for vehicle-based sidelink communications supports packet duplication using a set of carrier frequencies. The operations of 1305 may be performed according to the methods described herein. In certain examples, aspects of the operations of 1305 may be performed by a traffic profile manager as described with reference to FIGS. 5 through 8.

At 1310 the UE may transmit a request to a base station for resources to use to perform the vehicle-based sidelink communications, the request comprising an indication of the profile, a reliability metric associated with the profile, and an identifier that identifies the set of carrier frequencies. The operations of 1310 may be performed according to the methods described herein. In certain examples, aspects of the operations of 1310 may be performed by a request manager as described with reference to FIGS. 5 through 8.

At 1315 the UE may receive one or more grants from the base station for SPS resources allocated on the set of carrier frequencies in response to the request. The operations of 1315 may be performed according to the methods described herein. In certain examples, aspects of the operations of 1315 may be performed by a grant manager as described with reference to FIGS. 5 through 8.

Figure 14:
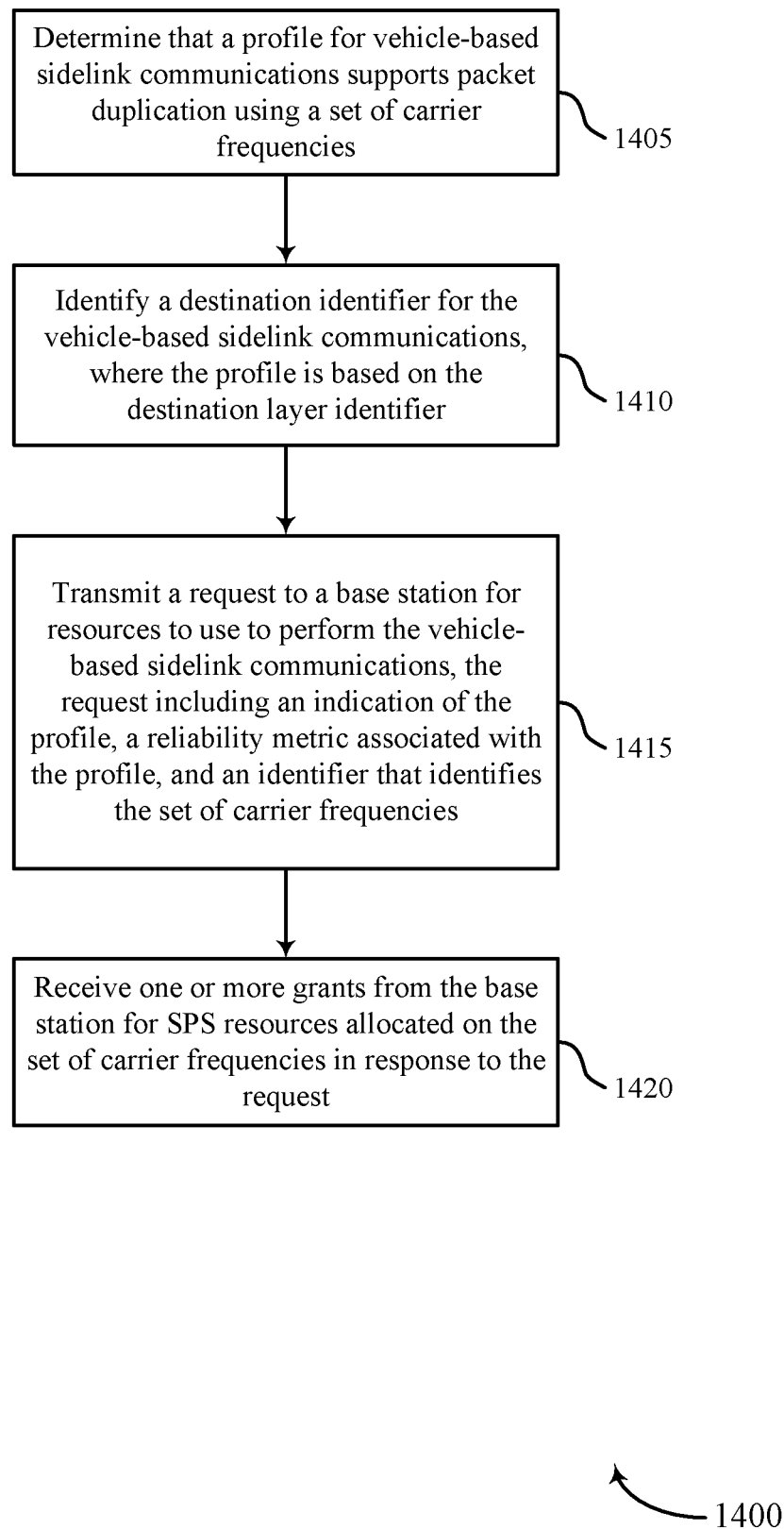

FIG. 14 shows a flowchart illustrating a method 1400 for network-assisted scheduling for packet duplication in vehicle-based sidelink communication in accordance with aspects of the present disclosure. The operations of method 1400 may be implemented by a UE or its components as described herein. For example, the operations of method 1400 may be performed by a communications manager as described with reference to FIGS. 5 through 8. In some examples, a UE may execute a set of codes to control the functional elements of the device to perform the functions described below. Additionally or alternatively, the UE may perform aspects of the functions described below using special-purpose hardware.

At 1405 the UE may determine that a profile for vehicle-based sidelink communications supports packet duplication using a set of carrier frequencies. The operations of 1405 may be performed according to the methods described herein. In certain examples, aspects of the operations of 1405 may be performed by a traffic profile manager as described with reference to FIGS. 5 through 8.

At 1410 the UE may identify a destination identifier for the vehicle-based sidelink communications, wherein the profile is based on the destination identifier. The operations of 1410 may be performed according to the methods described herein. In certain examples, aspects of the operations of 1410 may be performed by a destination identifier manager as described with reference to FIGS. 5 through 8.

At 1415 the UE may transmit a request to a base station for resources to use to perform the vehicle-based sidelink communications, the request comprising an indication of the profile, a reliability metric associated with the profile, and an identifier that identifies the set of carrier frequencies. The operations of 1415 may be performed according to the methods described herein. In certain examples, aspects of the operations of 1415 may be performed by a request manager as described with reference to FIGS. 5 through 8.

At 1420 the UE may receive one or more grants from the base station for SPS resources allocated on the set of carrier frequencies in response to the request. The operations of 1420 may be performed according to the methods described herein. In certain examples, aspects of the operations of 1420 may be performed by a grant manager as described with reference to FIGS. 5 through 8.

Figure 15:
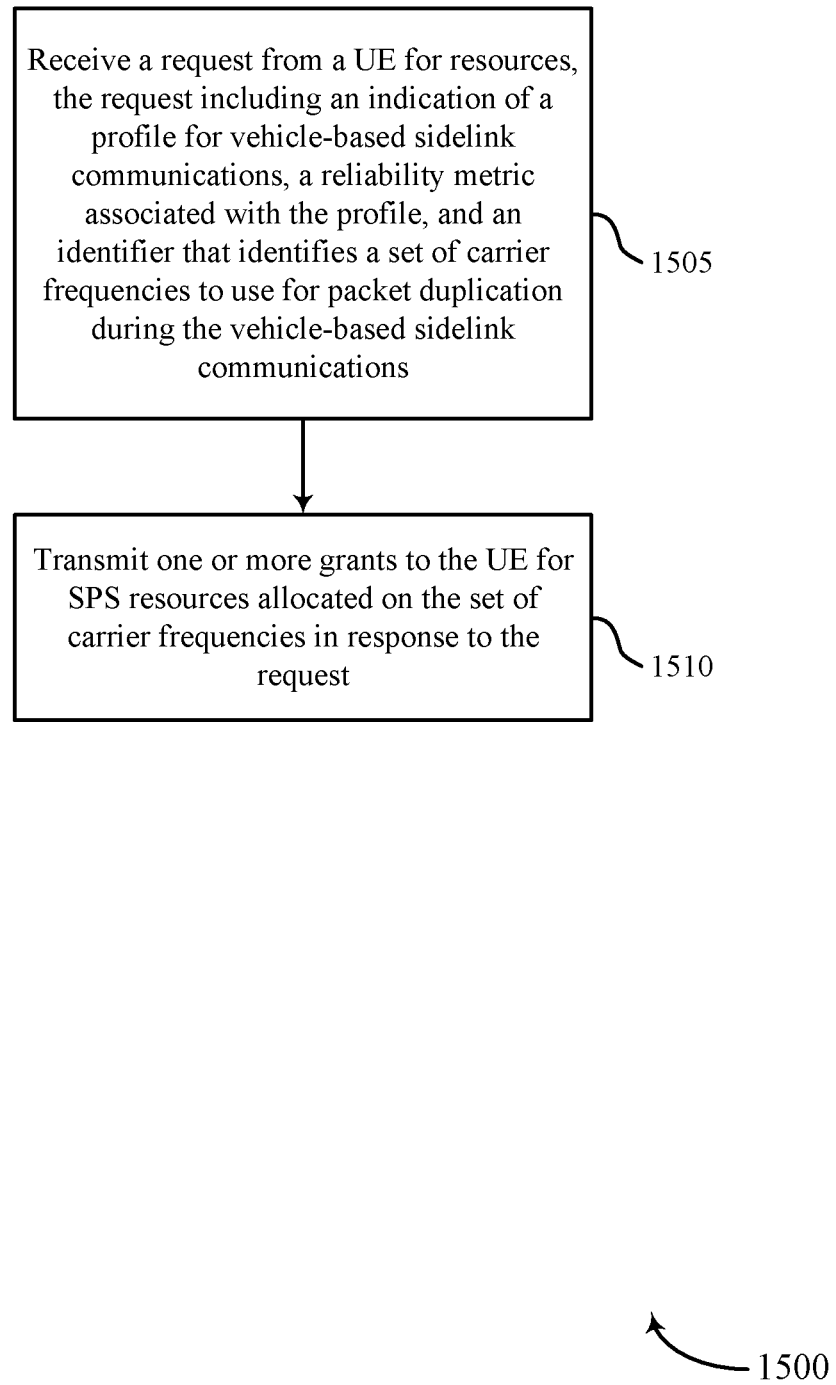

FIG. 15 shows a flowchart illustrating a method 1500 for network-assisted scheduling for packet duplication in vehicle-based sidelink communication in accordance with aspects of the present disclosure. The operations of method 1500 may be implemented by a base station or its components as described herein. For example, the operations of method 1500 may be performed by a communications manager as described with reference to FIGS. 9 through 12. In some examples, a base station may execute a set of codes to control the functional elements of the device to perform the functions described below. Additionally or alternatively, the base station may perform aspects of the functions described below using special-purpose hardware.

At 1505 the base station may receive a request from a UE for resources, the request comprising an indication of a profile for vehicle-based sidelink communications, a reliability metric associated with the profile, and an identifier that identifies a set of carrier frequencies to use for packet duplication during the vehicle-based sidelink communications. The operations of 1505 may be performed according to the methods described herein. In certain examples, aspects of the operations of 1505 may be performed by a request manager as described with reference to FIGS. 9 through 12.

At 1510 the base station may transmit one or more grants to the UE for SPS resources allocated on the set of carrier frequencies in response to the request. The operations of 1510 may be performed according to the methods described herein. In certain examples, aspects of the operations of 1510 may be performed by a grant manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to fas CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like).

An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    determining that a profile for vehicle-based sidelink communications supports packet duplication using a set of carrier frequencies;
    transmitting a first message comprising a request to a base station for resources to use to perform the vehicle-based sidelink communications, the request comprising an indication of the profile and an identifier that identifies a subset of carrier frequencies of the set of carrier frequencies to use for the packet duplication based at least in part on a traffic pattern of the profile for the vehicle-based sidelink communications;
    transmitting, in response to the first message, a second message comprising a reliability metric associated with the profile for the vehicle-based sidelink communications, wherein the packet duplication for the vehicle-based sidelink communications is supported based at least in part on the reliability metric satisfying a threshold value; and
    receiving one or more grants from the base station for semi-persistent scheduling (SPS) resources allocated on the set of carrier frequencies in response to the request.

2. The method of claim 1, further comprising:
    transmitting a signal indicating that packet duplication is supported using the set of carrier frequencies.

3. The method of claim 1, wherein the first message comprises a sidelink information message.

4. The method of claim 1, wherein the second message comprises an assistance information message, the assistance information message comprising an index value associated with the profile.

5. The method of claim 4, further comprising:
    configuring the assistance information message to indicate a subset of carrier frequencies of the set of carrier frequencies to indicate the number of carrier frequencies to use for packet duplication.

6. The method of claim 1, further comprising:
    identifying a destination identifier for the vehicle-based sidelink communications, wherein the profile is based at least in part on the destination identifier.

7. The method of claim 1, further comprising:
    receiving the one or more grants in one or more downlink control indicators (DCIs) from the base station.

8. The method of claim 7, further comprising:
    receiving more than one grant containing the same SPS index.

9. A method for wireless communication at a base station, comprising:
    receiving a first message comprising a request from a user equipment (UE) for resources, the request comprising an indication of a profile for vehicle-based sidelink communications and an identifier that identifies a subset of carrier frequencies of a set of carrier frequencies to use for packet duplication based at least in part on a traffic pattern of the profile, during the vehicle-based sidelink communications;
    receiving, in response to the first message, a second message comprising a reliability metric associated with the profile for the vehicle-based sidelink communications;
    determining whether to support the packet duplication for the vehicle-based sidelink communications based at least in part on the reliability metric satisfying a threshold value; and
    transmitting one or more grants to the UE for semi-persistent scheduling (SPS) resources allocated on the set of carrier frequencies in response to the request.

10. The method of claim 9, wherein the one or more grants are configured based at least in part on the determination.

11. The method of claim 9, further comprising:
   identifying the set of carrier frequencies to use for packet duplication based at least in part on at least one of the reliability metric satisfying the threshold value, or an availability of a sidelink resource, or a combination thereof.

12. The method of claim 9, wherein transmitting the one or more grants comprises:
   configuring a radio resource control (RRC) message to indicate an SPS configuration associated with the set of carrier frequencies to use for packet duplication and a corresponding SPS index.

13. The method of claim 12, wherein the SPS configuration is associated with one or more grants matching the profile for the vehicle-based sidelink communications.

14. The method of claim 9, further comprising:
   receiving a signal indicating that packet duplication is supported using the set of carrier frequencies.

15. The method of claim 9, wherein the first message comprises a sidelink information message from the UE indicating the profile and the identifier.

16. The method of claim 9, wherein the second message comprises an assistance information message from the UE indicating the reliability metric, the assistance information message comprising an index value associated with the profile.

17. The method of claim 16, further comprising:
   decoding the assistance information message to identify a subset of carrier frequencies of the set of carrier frequencies that indicates the number of carrier frequencies to use for packet duplication.

18. The method of claim 9, wherein the profile is based at least in part on a destination identifier associated with the vehicle-based sidelink communications.

19. The method of claim 9, further comprising:
   transmitting the one or more grants in one or more downlink control indicators (DCIs) containing an SPS index.

20. An apparatus for wireless communications, comprising:
   a processor,
   memory in electronic communication with the processor; and
   instructions stored in the memory and executable by the processor, to cause the apparatus to:
      determine that a profile for vehicle-based sidelink communications supports packet duplication using a set of carrier frequencies;
      transmit a first message comprising a request to a base station for resources to use to perform the vehicle-based sidelink communications, the request comprising an indication of the profile and an identifier that identifies a subset of carrier frequencies of the set of carrier frequencies to use for the packet duplication based at least in part on a traffic pattern of the profile for the vehicle-based sidelink communications;
      transmit, in response to the first message, a second message comprising a reliability metric associated with the profile for the vehicle-based sidelink communications, wherein the packet duplication for the vehicle-based sidelink communications is supported based at least in part on the reliability metric satisfying a threshold value; and
      receive one or more grants from the base station for semi-persistent scheduling (SPS) resources allocated on the set of carrier frequencies in response to the request.

21. The apparatus of claim 20, wherein the instructions are further executable by the processor to cause the apparatus to:
   transmit a signal indicating that packet duplication is supported using the set of carrier frequencies.

22. The apparatus of claim 20, wherein the first message comprises a sidelink information message to the base station to indicate the profile and the identifier.

23. The apparatus of claim 20, wherein the second message comprises an assistance information message to the base station to indicate the reliability metric, the assistance information message comprising an index value associated with the profile.

24. The apparatus of claim 20, wherein the instructions are further executable by the processor to cause the apparatus to:
   receive the one or more grants in one or more downlink control indicators (DCIs) from the base station.

25. The apparatus of claim 24, wherein the instructions are further executable by the processor to cause the apparatus to:
   receive more than one grant containing the same SPS index.

26. An apparatus for wireless communications, comprising:
   a processor,
   memory in electronic communication with the processor; and
   instructions stored in the memory and executable by the processor, to cause the apparatus to:
      receive a first message comprising a request from a user equipment (UE) for resources, the request comprising an indication of a profile for vehicle-based sidelink communications and an identifier that identifies a subset of carrier frequencies of a set of carrier frequencies to use for packet duplication based at least in part on a traffic pattern of the profile, during the vehicle-based sidelink communications;
      receive, in response to the first message, a second message comprising a reliability metric associated with the profile for the vehicle-based sidelink communications;
      determine whether to support the packet duplication for the vehicle-based sidelink communications based at least in part on the reliability metric satisfying a threshold value; and
      transmit one or more grants to the UE for semi-persistent scheduling (SPS) resources allocated on the set of carrier frequencies in response to the request.

27. The apparatus of claim 26, wherein the instructions are further executable by the processor to cause the apparatus to:
   determine, based at least in part on the request, whether to support packet duplication for the vehicle-based sidelink communications, wherein the one or more grants are configured based at least in part on the determination.

28. The apparatus of claim 26, wherein the instructions to transmit the one or more grants are executable by the processor to cause the apparatus to:
   configure a radio resource control (RRC) message to indicate an SPS configuration associated with the set of carrier frequencies to use for packet duplication and a corresponding SPS index.

29. The apparatus of claim 26, wherein the first message comprises a sidelink information message from the UE indicating the profile and the identifier.

* * * * *